United States Patent
Makarychev-Mikhailov et al.

(10) Patent No.: US 12,345,667 B2
(45) Date of Patent: Jul. 1, 2025

(54) X-RAY FLUORESCENCE SPECTROSCOPY ANALYSIS

(71) Applicant: Schlumberger Technology Corporation, Sugar Land, TX (US)

(72) Inventors: Sergey Mikhailovich Makarychev-Mikhailov, Cambridge (GB); Isabelle Atheaux, Cambridge (GB); Débora Campos de Faria, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 450 days.

(21) Appl. No.: 17/938,178

(22) Filed: Oct. 5, 2022

(65) Prior Publication Data

US 2023/0128930 A1 Apr. 27, 2023

Related U.S. Application Data

(60) Provisional application No. 63/262,354, filed on Oct. 11, 2021.

(51) Int. Cl.
*G01N 23/223* (2006.01)

(52) U.S. Cl.
CPC ..... *G01N 23/223* (2013.01); *G01N 2223/076* (2013.01); *G01N 2223/507* (2013.01)

(58) Field of Classification Search
CPC .......... G01N 23/223; G01N 2223/076; G01N 2223/507
See application file for complete search history.

(56) References Cited

U.S. PATENT DOCUMENTS

| | | | | |
|---|---|---|---|---|
| 4,510,573 | A * | 4/1985 | Boyce | G01V 5/12 250/269.1 |
| 5,519,214 | A * | 5/1996 | Houwen | E21B 49/005 378/45 |
| 7,595,489 | B2 * | 9/2009 | Statham | G01N 23/22 378/53 |
| 9,244,006 | B2 | 1/2016 | Weidmann et al. | |
| 2006/0291619 | A1 * | 12/2006 | Statham | G01N 23/22 378/45 |
| 2019/0258184 | A1 * | 8/2019 | Kobayashi | G03G 9/09708 |
| 2020/0003711 | A1 * | 1/2020 | Mizuno | G01N 23/223 |
| 2022/0268735 | A1 * | 8/2022 | Sheldon | G01N 27/9073 |
| 2022/0412944 | A1 * | 12/2022 | Ravansari | G01N 33/24 |

(Continued)

OTHER PUBLICATIONS

Davison, J. M., and et al. "Rig-site monitoring of the drilling fluid solids content and solids-control equipment discharge." SPE drilling & completion 14, No. 02 (1999): 130-138 (Year: 1999).*

(Continued)

*Primary Examiner* — Douglas Kay
(74) *Attorney, Agent, or Firm* — Jeffrey D. Frantz

(57) ABSTRACT

Multivariate machine learning (ML) techniques can be applied to an XRF spectra and mitigate matrix effects and enable simultaneous quantification of composition, even when markers elements or ions of interest are imperceptible in the XRF spectra. Physical (e.g., density) and chemical (e.g., total dissolved solids and hardness) properties of the material can be also quantified using ML techniques.

19 Claims, 9 Drawing Sheets

(56) References Cited

U.S. PATENT DOCUMENTS

2024/0019386 A1* 1/2024 Kaiser .................. G01N 33/24

OTHER PUBLICATIONS

Atheaux, I. et al., "Produced Water, X-Ray Fluorescence Spectrometry and Machine Learning: How Can They be Connected", SPE International Oilfield Scale Conference and Exhibition, Aberdeen Scotland, May 25-26, 2022, SPE-209505-MS, 18 pages.

Davison, J.M. et al., "Rig-Site Monitoring of the Drilling Fluid Solids Content and Solids-Control Equipment Discharge", SPE Driling Completions 14(2), Jun. 1999, SPE-56871-PA, pp. 130-138.

Houwen, O.H. et al., "Measurement of Composition of Drilling Mud by X-Ray Fluorescence", 1993 SPE/IADC Drilling Conference, Amsterdam, Netherlands, Feb. 23-25, 1993, SPE/IADC-25704, pp. 277-286.

Lu, J. et al., "On-Site Fluids and Solids Characterisation with Benchtop XRF Analyzer", SPE International Conference on Oilfield Chemistry, Galveston, Texas, USA, Apr. 8-9, 2019, SPE-193545-MS, 9 pages.

Lawal, L.O. et al., "Total Organic Carbon Characterization Using Neural-Network Analysis of XRF Data", Petrophysics 60(4), Aug. 2019, SPWLA-2019-v60n4a2, pp. 480-493.

Saasen, A. et al., "Automatic Measurement of Drilling Fluid and Drill-Cuttings Properties", SPE Drilling Completions 24(4), Dec. 2009, SPE-112687-PA, pp. 611-625.

Wang, Q. et al., "Lithology Identification Technology Using BP Neural Network Based on XRF", Acta Geophysica 69, Sep. 13, 2021, pp. 2231-2240.

Yan, C. et al., "Produced Water Analysis by X-Ray Fluorescence with and without the Presence of Crude Oil", Abu Dhabi International Petroleum Exhibition Conference, Abu Dhabi, UAE, Nov. 13-16, 2017, SPE-188225-MS, 13 pages.

Panchuk, V. et al., "Application of Chemometric Methods to XRF-data—A Tutorial Review", Anal. Chim. Acta 1040, Dec. 21, 2018, pp. 19-32.

* cited by examiner

X-RAY FLUORESCENCE SPECTROSCOPY ANALYSIS

CROSS-REFERENCE TO RELATED APPLICATIONS

This application claims the benefit of, and priority to, U.S. Patent Application No. 63/262,354, filed Oct. 11, 2021 and titled "X-Ray Fluorescence Spectroscopy Analysis", which application is expressly incorporated herein by this reference in its entirety.

BACKGROUND

X-ray fluorescence (XRF) spectrometry is one example method of chemical analysis, which allows detection of a broad range of elements in a sample by irradiating (exciting) the sample with an external x-ray source and detecting induced (secondary) x-ray fluorescence radiation emitted by elements. Elements appear in the XRF spectra with peaks having characteristic energies unique to each element, and an intensity which depends on element concentration in the sample. Peak parameters such as energy (position) and intensity (height or area) can thus be used to quantify concentrations of elements in the sample. As an analytical method, XRF spectroscopy has been used in various commercial applications, including in the oilfield, such as for drilling fluid or cutting analysis.

BRIEF DESCRIPTION OF THE DRAWINGS

FIGS. 2-1 and 2-2 are plots of Al filtered Main range XRF spectra of multicomponent produced waters and show the full spectra (FIG. 2-1) and a zoom of a low energy region of the spectra (FIG. 2-2), according to embodiments of the present disclosure.

FIGS. 6-1 and 6-2 are plots of correlations between Cl and Na concentrations (FIG. 6-1) and between K and Na concentrations (FIG. 6-2) in tested samples, according to an embodiment of the present disclosure.

DETAILED DESCRIPTION

Embodiments of the present disclosure relate to methods for chemical analysis with XRF spectrometry. More particularly, some embodiments relate to chemical analysis with XRF spectrometry that use mathematical spectra processing to detect elements not showing measurable or unique characteristic fluorescence peaks in the XRF spectra. More particularly still, some embodiments relate to methods and systems or devices which use XRF spectrometry to quantify physical and chemical properties dependent on sample composition that include the features described herein.

In performing XRF according to aspects of the present disclosure, a challenge arises and is referred to as the matrix effect. Peak intensity can depend not only on the concentration of the element producing the intensity, but also on other elements in the sample, and which may absorb fluorescence from that element or enhance it. For example, the secondary radiation (e.g., fluorescence) of heavier elements in the sample can excite the light element(s) in the sample, and a portion of the measured light element fluorescence can be due to the excitation from the heavy element fluorescence. Example approaches to mitigation of the matrix effect can include: (i) performing calibrations and measurements in the same matrix; (ii) using physical fundamental parameters (FP) to calculate inter-element interferences and applying matrix corrections; (iii) applying different normalizations techniques to XRF spectra, e.g., normalizing by Compton or Rayleigh scattering peaks; or (iv) using various multivariate spectra processing techniques.

In other aspects of the present disclosure, methods are used to process XRF spectra to extract information on samples, which information is not immediately visible from the spectra.

For instance, in an illustrative embodiment, the XRF spectra (or a chosen energy range) are analyzed to quantify concentrations of light elements (e.g., Na and Mg), which do not show any characteristic peaks in the spectra due to the low energy/low intensity of their fluorescence and/or due to insufficient sensitivity/resolution of the equipment.

In another example embodiment, XRF spectra are correlated with physical and chemical aqueous sample properties, for example, density, electrical conductivity, total dissolved solids, hardness, and other, which properties can generally depend on sample composition, but are difficult to estimate just from a knowledge of the composition. Calculating these properties based on XRF spectra data alone allows reduction of the number of measurements that may be used to characterize samples. Various other features and aspects of embodiments of the present disclosure will become clear from examples below.

Figure 1:
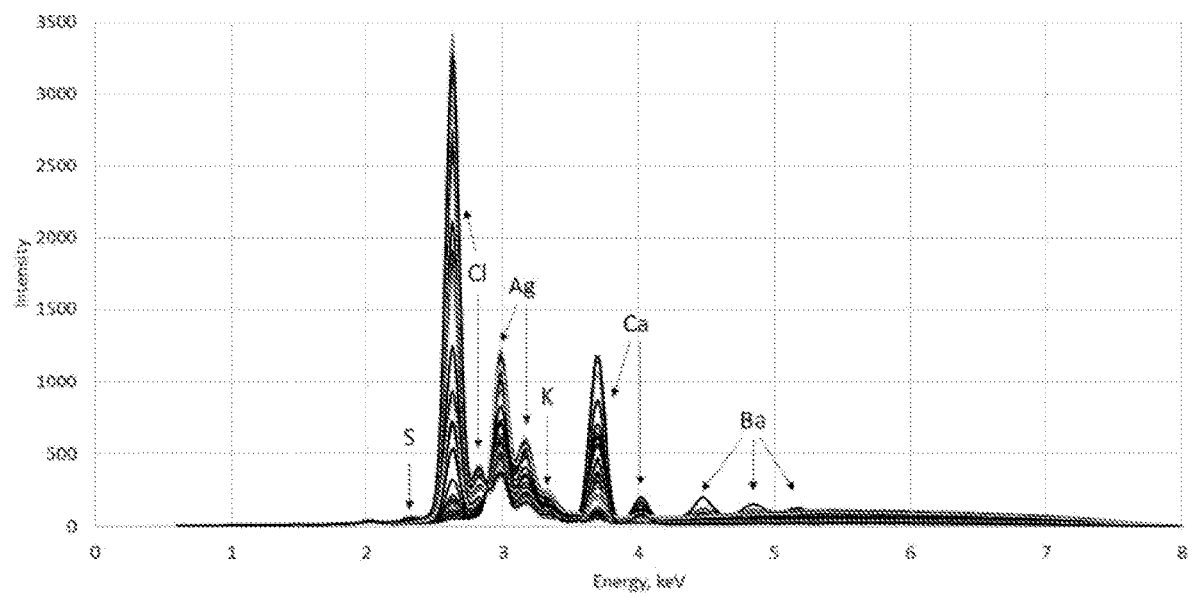
FIG. 1 is a plot of unfiltered Light range XRF spectra of synthetic multicomponent produced waters, according to an embodiment of the present disclosure.

In a laboratory setting, 119 multicomponent aqueous solutions, which mimic produced waters, were prepared in the lab with varying concentrations of nine ions of interest. These ions include $Na^+$, $Mg^{2+}$, $K^+$, $Ca^{2+}$, $Sr^{2+}$, $Ba^{2+}$, $Cl^-$, $Br^-$, and $SO_4^{2-}$. A multivariate calibration is performed by recording XRF spectra of all the samples with an XRF analyzer. The analyzer used in the testing has four different ranges (Light, Low, High, and Main) developed for elements with different atomic masses. XRF spectra for all the samples are recorded twice for each sample and each range, and then averaged. The Light range spectra are shown in FIG. 1, which is an example of the unfiltered light range XRF spectra of synthetic multicomponent produced waters. Multiple peaks can be observed on the spectra, with some directly associated with elements present in the samples. In some examples, there can be more than one peak for each element depending on excitation energy, and some peaks visible in the spectra can be due to the x-ray tube composition (Ag). It should be understood that while examples referring to produced waters and samples mimicking produced waters are described, the presently described systems and methods are applicable to other fluid sample types including non-aqueous fluids, brines, suspensions, solutions, emulsions, other materials, and combinations thereof.

To avoid obscuring the inventive concepts herein, a deep review of the physics of x-ray fluorescence is not provided as it is understood by those skilled in the art. It should be noted, however, that peak energies are characteristic to elements, and are equivalent to the energy difference between the higher and lower atom states. This energy is released when an electron transfers from the excited higher to lower shell and so quantized photons are emitted as x-rays. Heavier elements have more peaks, as they have more energy levels, and those with high energy usually have higher intensities. Non-characteristic peaks (or those difficult to attribute to a particular element in the sample) and overlapping peaks can also be found in XRF spectroscopy and originate from different x-ray scattering processes.

Figures 1, 2:
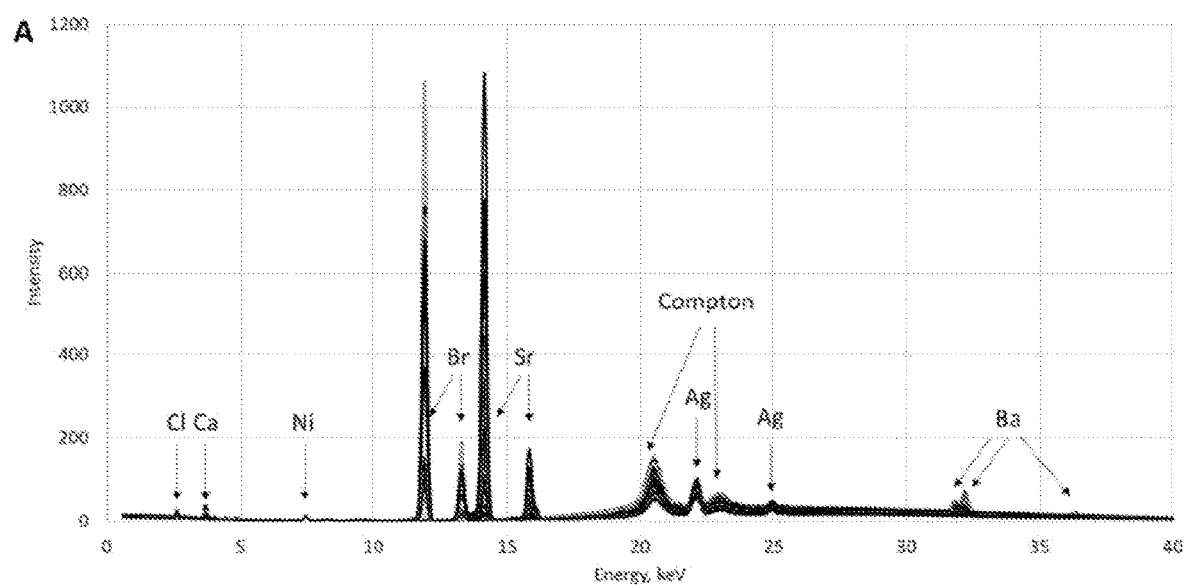
Figure 2:
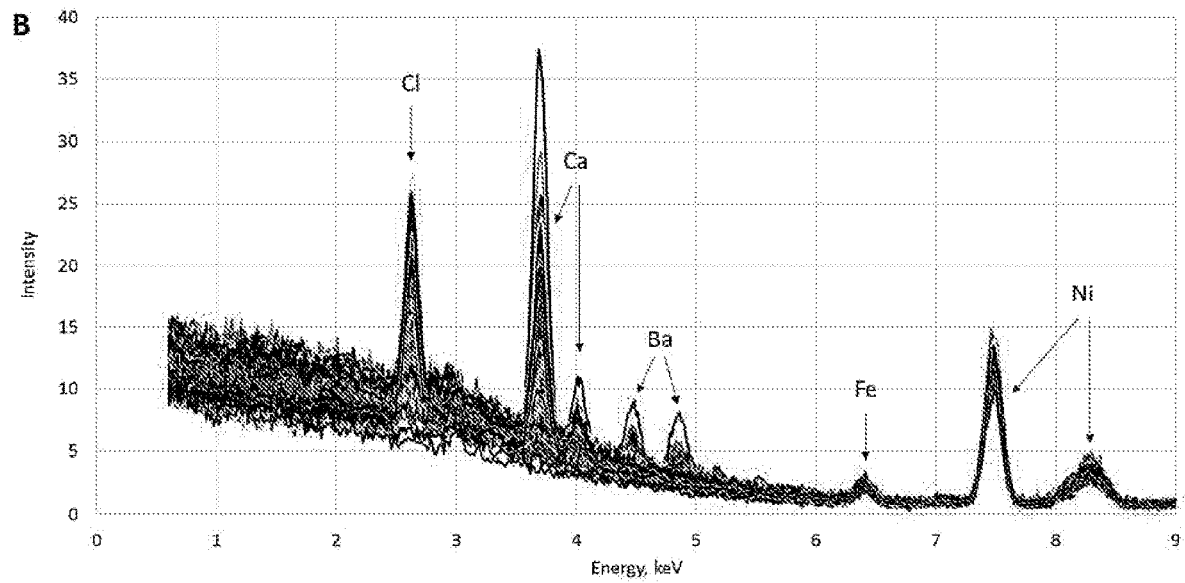

To avoid interference between elements of different atomic mass, modern XRF spectrometers can include filters to remove low energy radiation and allow focused analysis on medium atomic mass and/or heavy elements. Filtering and broadening the spectra energy range can result in additional peaks originating from the source tube and filter materials, as well as from other effects, like Compton scattering. An example of the spectra recorded in the Main range (Al filter to enable measurements of heavy elements, Ti to Au) is shown in FIGS. 2-1 and 2-2, where FIG. 2-1 is the Main range (Al filtered) of the full XRF spectra of multicomponent produced waters, and FIG. 2-2 is the zoom of the low energy region between 0 and 9 keV.

XRF spectroscopy is capable of detecting elements as light as beryllium (Be, atomic mass=9 amu), but typically requires expensive lab analyzers and sophisticated experimental protocols. For instance, such experimental protocols may use purging measurement cells with helium to remove air, or other complexities and expenses. Wide use of XRF analyzers may still include, however, portable and handheld devices, which are relatively inexpensive, require little maintenance, and can quickly quantify tens of elements, often without any sample preparation. The handheld devices have limitations in sensitivity, resolution, and accuracy. Depending on the model and manufacturer, the lightest detectable elements for handheld analyzers may be claimed to be Si, Al, or even Mg. However, analysis of light elements is still complicated, and can generally be possible only at high concentrations and with sample preparation, which may be impractical in the field.

Figure 3:
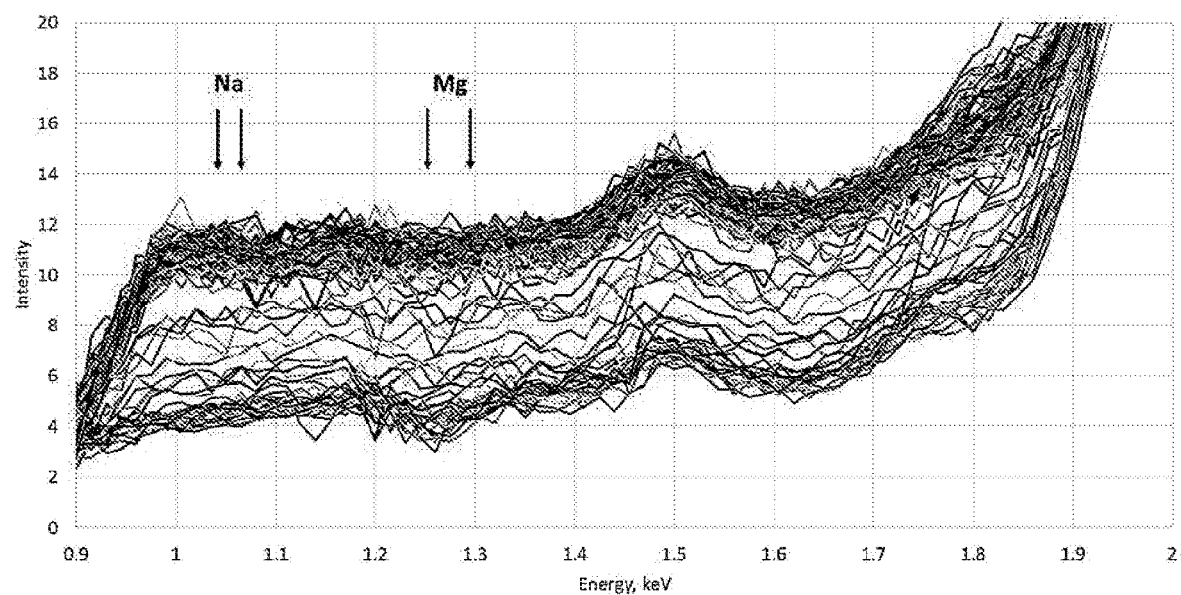
FIG. 3 is a plot of an XRF spectra of multicomponent produced waters, with a Light range zoomed to a low energy region, according to an embodiment of the present disclosure.

As an example, FIG. 3 presents XRF spectra recorded in the Light range of multicomponent produced waters (as in FIG. 1) but zoomed to the low energy region between 0.9 and 2 keV. While synthetic produced waters contain up to ~112,000 mg/l of Na (sodium ion) and up to 10,000 mg/l of Mg (magnesium ion), the peaks of these elements are not visible in the spectra. Red arrows on the plot show the energies of Na ($K\alpha 1$ at 1.041 and $K\alpha 2$ at 1.067 keV) and Mg ($K\alpha 1$ at 1.254 and $K\alpha 2$ at 1.297 keV) x-ray fluorescence lines.

Figure 4:
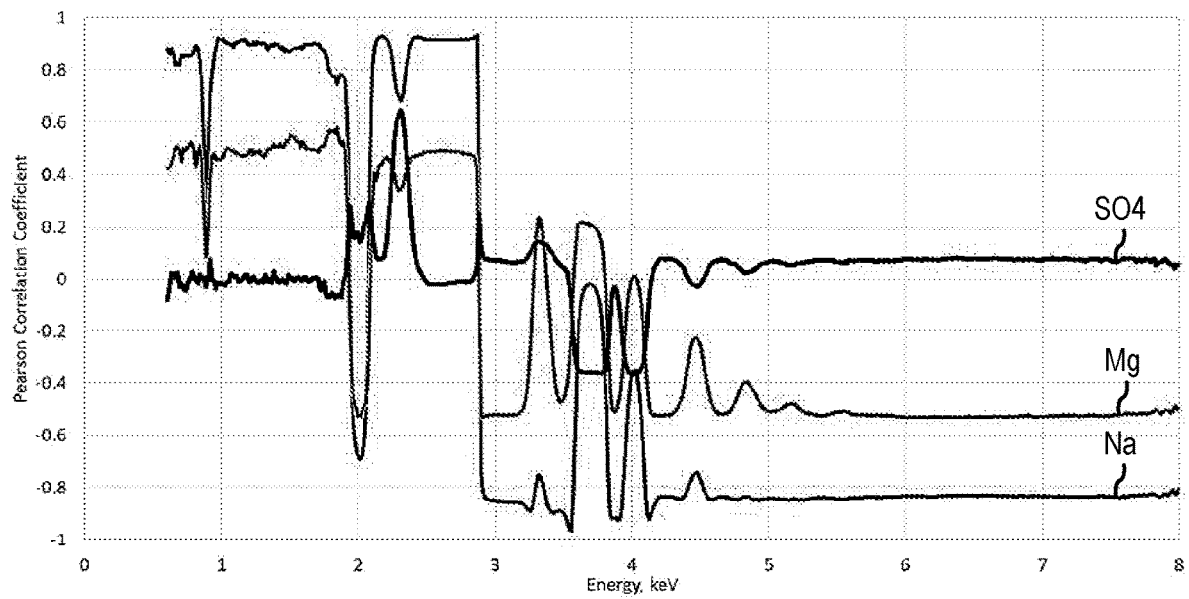
FIG. 4 is plot of Pearson correlation coefficients of three selected ion concentrations and XRF fluorescence intensities at different energies in a Light range spectrum, according to an embodiment of the present disclosure.

While the spectra lack specific Na and Mg peaks, there are many energies in the spectra, which are strongly correlated with either Na or Mg concentrations in the 119-sample dataset. FIG. 4, for instance, shows the Pearson correlation coefficients for three selected concentrations and XRF fluorescence intensities at different energies in the Light range spectra. The Na vs. fluorescence intensity varies from +0.932 (at 2.87 keV) down to −0.970 (at 3.56 keV), and for Mg from +0.582 (at 1.85 keV) to −0.537 (at 2.90 keV). Intensity correlations with sulfate ion ($SO_4$) are also added to the plot for comparison, showing the highest correlation at the S characteristic peak energy 0.647 (at 2.31 keV), as might be expected.

Figure 5:
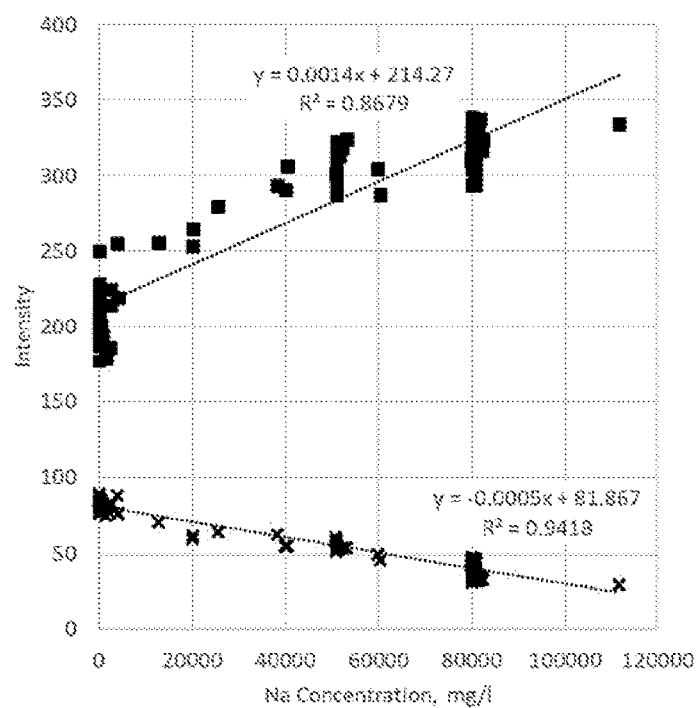
FIG. 5 is a scatterplot of fluorescence intensities at 2.87 keV (upper squares) and 3.56 keV (lower crosses) as a function of Na concentration, according to an embodiment of the present disclosure.

The positive Na correlation at 2.87 keV can be partially explained by correlation between Na and Cl, such as shown in FIG. 5, as Cl has fluorescence peak at about this energy ($K\beta 1$ at 2.82 keV), and NaCl is the major component of produced water, and the Cl can therefore function as a proxy for the total dissolved solids in the produces water.

Figures 1, 6:
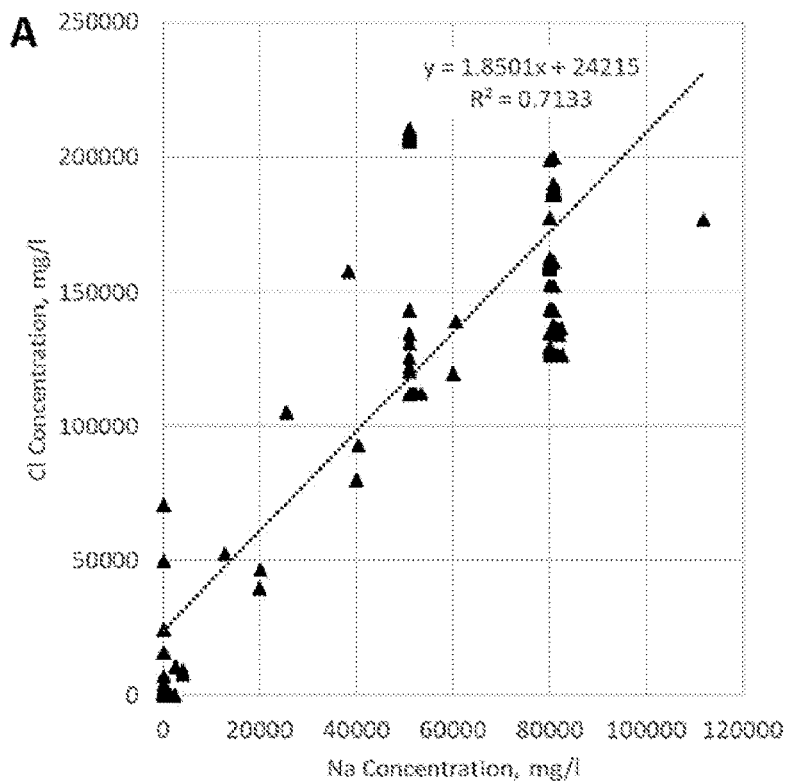
Figures 2, 6:
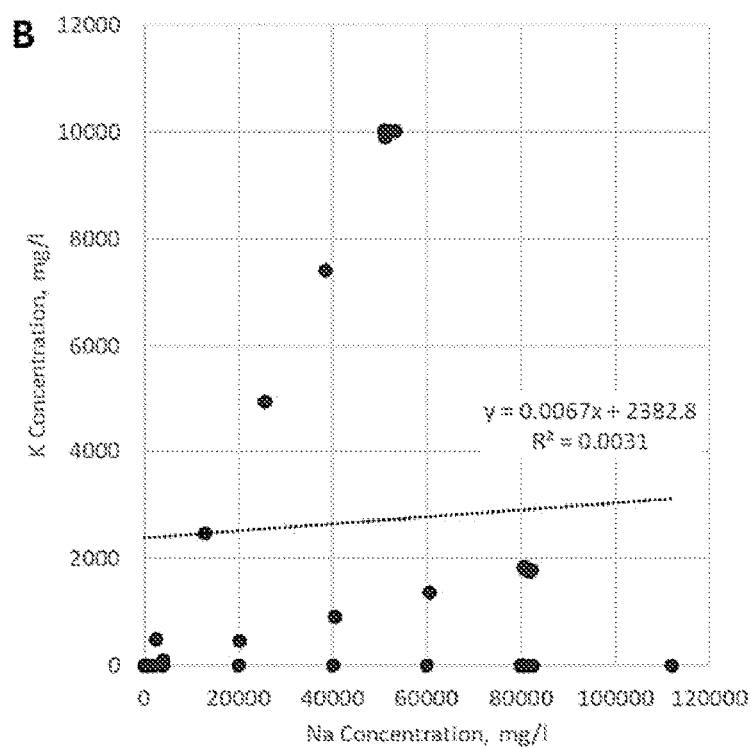

However, while the energy of the best (negative) correlation is reasonably close to the energy of the K peak ($K\beta 1$ at 3.59 keV), there is no correlation between Na and K concentrations in the tested aqueous solutions. For instance, see FIG. 6-1, which shows a correlation between Cl and Na concentrations and FIG. 6-2, which shows a correlation between K and Na concentrations in the tested samples.

Figure 7:
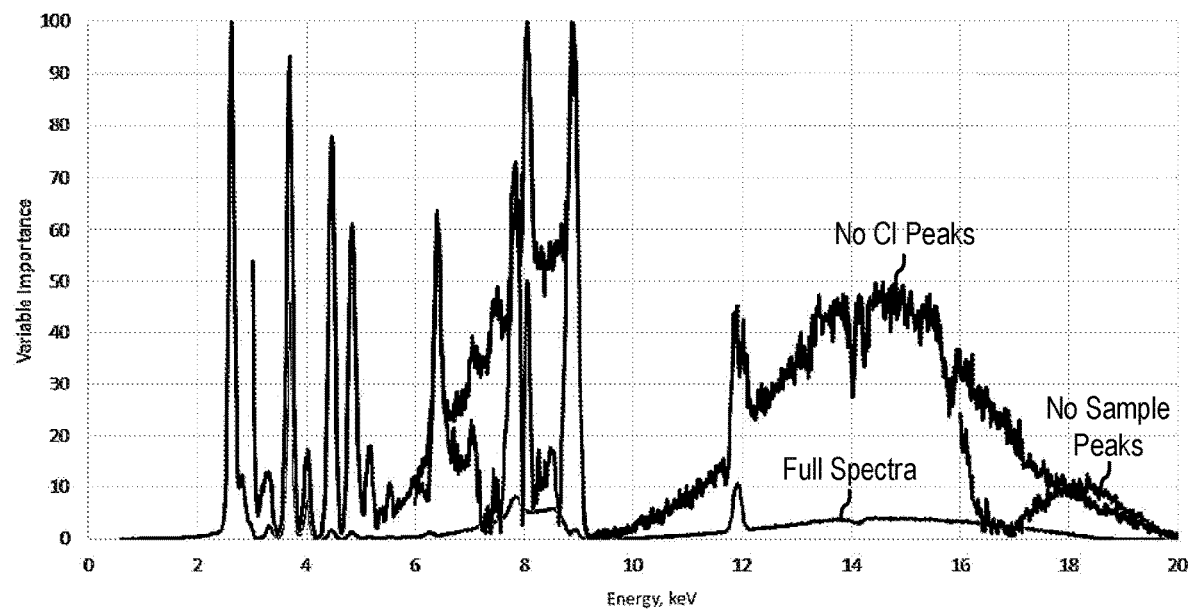
FIG. 7 is a plot of variable importance of Na PLS models built on full and truncated spectra, according to an embodiment of the present disclosure.

To eliminate the correlation between solution components, regions of the spectra with characteristic peaks of solution components were removed and partial least squares (PLS) models were built only on parts of the spectra. First, the low energy region (0.6-3.0 keV) was cut off, where Cl peaks (at 2.62 and 2.82 keV) occur, and then the regions of the spectra, where any characteristic peaks of any sample component are present (0.6-6.0 keV and 11-16 keV) were removed as well. While the original full spectra PLS model gave Na range-normalized root mean square error (NRMSE) of 3.0%, the model based on spectra without Cl peaks gave NRMSE of 4.1% and the model based on the fully castrated spectra resulted in NRSME of 11.7%. While the errors are obviously higher in truncated spectra, they are still reasonable and sufficient for many applications. Variable importance metrics for the three PLS models are presented on FIG. 7, which shows the variable importance of Na PLS models built on full and truncated spectra. FIG. 7 shows that in absence of characteristic peaks, PLS builds models on spectra regions with scattering data, as they still retain information on concentrations of light elements.

XRF spectra recorded at other ranges (with the source radiation filtered to better detect heavier elements) also have regions with high correlation coefficients for Na and Mg. The example of the Main range spectra is presented on FIG.

Figure 8:
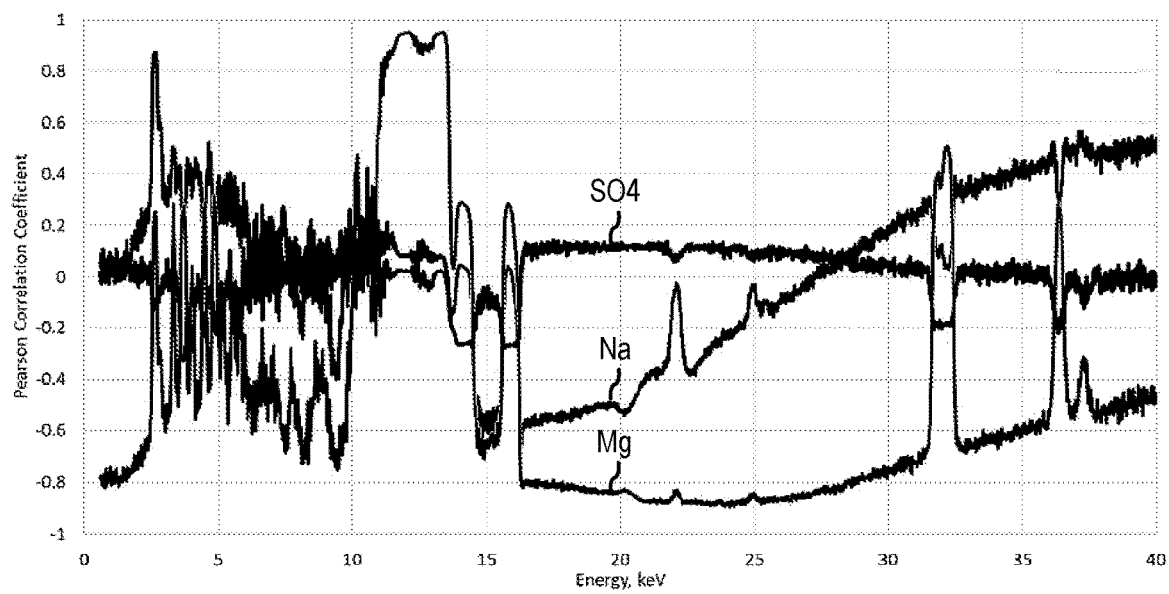
FIG. 8 is a plot of Pearson correlation coefficients of three selected ion concentrations and XRF fluorescence intensities at different energies of a Main range spectra, according to an embodiment of the present disclosure.

8, which shows Pearson correlation coefficients of three selected ion concentrations and XRF fluorescence intensities at different energies in the Main range spectra. As seen from FIG. 8, Mg shows better correlation than Na, particularly in the scattering region (20-25 keV).

reliable analytical results for Na and Mg concentration are not expected and thus remarkable. In fact, errors of determination of Na and Mg concentrations can be even lower than those of some heavier elements with characteristic peaks in XRF spectra.

TABLE 1

| Method | Range | Na | Mg | SO4 | CL | K | Ca | Br | Sr | Ba |
|---|---|---|---|---|---|---|---|---|---|---|
| PLS | Light | 6.2% | 10.2% | 11.7% | 5.5% | 11.1% | 8.5% | 11.7% | 20.8% | 18.0% |
| PLS | Low | 3.0% | 5.8% | 24.0% | 3.7% | 5.2% | 6.2% | 5.5% | 10.9% | 9.1% |
| PLS | High | 5.2% | 7.7% | 24.7% | 4.5% | 6.5% | 6.6% | 5.9% | 9.2% | 2.6% |
| PLS | Main | 4.9% | 7.5% | 23.7% | 4.5% | 5.8% | 5.7% | 4.6% | 10.0% | 4.8% |
| MARS | Light | 2.4% | 5.8% | 4.0% | 3.7% | 5.3% | 4.8% | 4.6% | 13.5% | 4.5% |
| MARS | Low | 2.3% | 5.6% | 24.7% | 3.0% | 4.1% | 5.3% | 2.5% | 7.6% | 3.3% |
| MARS | High | 5.9% | 6.6% | 26.6% | 4.8% | 5.0% | 6.3% | 3.6% | 8.1% | 2.3% |
| MARS | Main | 6.4% | 6.1% | 29.3% | 3.9% | 4.4% | 6.6% | 3.0% | 7.4% | 2.6% |
| Cubist | Light | 2.5% | 8.7% | 8.7% | 3.5% | 7.0% | 5.0% | 7.5% | 13.2% | 8.5% |
| Cubist | Low | 3.7% | 5.6% | 21.3% | 3.3% | 4.4% | 6.9% | 2.6% | 9.5% | 5.4% |
| Cubist | High | 13.5% | 6.7% | 25.3% | 4.4% | 4.2% | 6.5% | 3.3% | 9.2% | 2.5% |
| Cubist | Main | 10.9% | 6.1% | 26.8% | 3.6% | 4.1% | 6.0% | 2.5% | 8.9% | 3.5% |
| RF | Light | 4.0% | 12.2% | 9.2% | 3.5% | 15.8% | 6.5% | 15.3% | 15.6% | 18.5% |
| RF | Low | 9.5% | 6.6% | 23.2% | 6.0% | 4.8% | 5.1% | 3.4% | 11.4% | 5.2% |
| RF | High | 8.7% | 7.0% | 24.0% | 7.0% | 5.9% | 6.9% | 4.7% | 11.6% | 4.7% |
| RF | Main | 11.7% | 7.6% | 23.1% | 8.4% | 6.5% | 7.1% | 5.2% | 9.5% | 5.2% |

Several aspects are believed to contribute to the observed correlations. These include:
 a) Original correlations of light element concentrations with their counter-ions, which do have pronounced fluorescence peaks in the spectra (as in the above example of NaCl);
 b) Absorption of heavier element fluorescence radiation by light elements, which explains negative correlation coefficients; and
 c) Rayleigh and Compton scattering (photon-electron interactions), which are known to result in broad non-characteristic peaks in XRF spectra and depend on sample matrices, including light elements.

For the synthetic produced water dataset of 119 samples, a number of multivariate techniques can be applied. Examples include multilinear regression (MLR) to other linear methods (e.g., Principal Component Regression (PCR), partial least squares (PLS), etc.) to more sophisticated machine learning algorithms. As the number of samples in this study is relatively small, many models tended to overfit data and so rigorous cross-validation (CV) was performed to select the best model. The cross-validation was performed with 5-folds repeated 10 times, which provided 50 models for each method/spectra range/analyte combination. The range-normalized root mean square error (NRMSE) was chosen as the main metric of model and method quality, with median NRMSE values (from 50 CV models) calculated for each method.

Cross-validation errors of prediction demonstrated by selected algorithms are presented in Table 1, which shows the median values of range-normalized root mean square errors (NRMSE) for selected multivariate methods and elements. The lowest media NRMSE values for each element are highlighted. While concentrations of medium and heavy elements (S+) are measurable in produced waters, In this embodiment, the MARS method (Multivariate Adaptive Regression Splines) provides the best outcome for most elements. Cubist (a rule-based machine learning method) is the second, and PLS is the third, even though it is probably the most straightforward and fastest method of all shown here. For the data set used herein, the popular Random Forest (RF) method shows the worst results.

While the explicit knowledge of all element concentrations in samples of interest is often desirable, it is sometimes also important to know physical or chemical properties of the samples. Some of these properties can be obviously measured directly and some can be estimated from the chemical composition. It can be useful, however, to reduce the number of measurements down to only those that are critical, and displace cumbersome measurements and improve accuracy of calculated properties.

As XRF spectroscopy traditionally provided information only on medium-to-heavy elements, the calculation of many sample properties was not possible, as the full sample composition was still unknown. Embodiments of the present disclosure open the way to calibration models not just for all elements, but also for many important physical and chemical properties, depending on full composition.

In the example below (see Table 2), two physical properties (density and electrical conductivity) and two chemical properties (total dissolved solids (TDS) and hardness), are predicted using the PLS method applied to the sample dataset.

TABLE 2

| Method | Range | Conductivity | Density | TDS | Hardness |
|---|---|---|---|---|---|
| PLS | Light | 4.6% | 5.1% | 5.3% | 8.1% |
| PLS | Low | 4.9% | 3.6% | 3.6% | 5.4% |

TABLE 2-continued

| Method | Range | Conductivity | Density | TDS | Hardness |
|---|---|---|---|---|---|
| PLS | High | 4.8% | 4.0% | 4.3% | 6.1% |
| PLS | Main | 4.8% | 4.3% | 4.4% | 5.2% |

In some embodiments, conductivity, density, and TDS is correlated to Na concentration, as it is one of the ions in produced waters, whereas hardness includes Mg. In some embodiments, the correlation between Na and Cl allows Cl concentration to be a proxy for TDS, as well. Electrical conductivity of aqueous solutions may be relatively straightforward to measure with different probes (also in-line), and density measurements are possible with different types of densitometers/flowmeters (e.g., Coriolis type, in-line). However, accurate TDS measurements can often require a gravimetric analysis with sample collection and evaporation, and hardness measurements often requiring either titration or using instruments, which are not easy to deploy in the field.

Thus, approaches of the present disclosure can use one method (XRF), which provides information on composition, as well as physical and chemical properties, all at once. The calibrations and corrections to the XRF data based at least partially on the multivariate model described herein allow identification and/or quantification of elements or ions present in the measures sample that are otherwise not measurable due to the matrix effects. For example, the multivariate model can allow the creation and application of a calibration file that accounts for the known matrix effects (overlapping energies of characteristic x-rays from the matrix material, secondary excitation and emissions of the matrix material, absorption of the characteristic x-rays by the matrix material) at the XRF detector or a computing device in data communication with the XRF detector. In some embodiments, a computing device in data communication with the XRF detector has a processor and a hardware storage device having instructions stored thereon that, when executed by the processor, cause the computing device to perform at least part of any method described herein.

Figure 9:
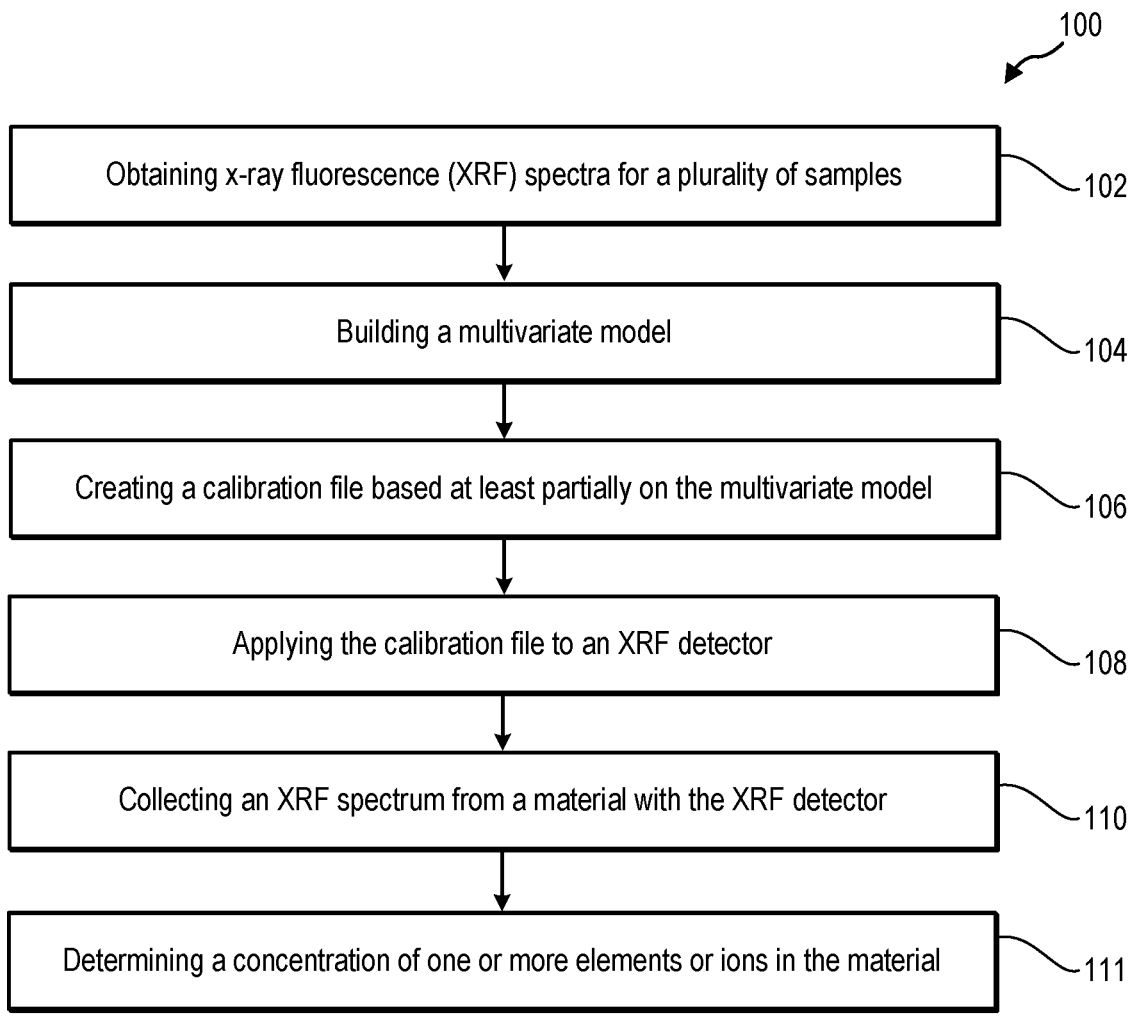
FIG. 9 is a flowchart illustrating a method of analyzing concentration of an element in a material, according to at least some embodiments of the present disclosure.

FIG. 9 is a flowchart illustrating a method 100 of analyzing concentration of an element in a material, according to some embodiments of the present disclosure. The method 100 includes obtaining XRF spectra for a plurality of samples, where each sample of the plurality of samples contains a known concentration of at least one element at 102. In some embodiments, the XRF spectra are collected with the same XRF detector. In some embodiments, the XRF spectra are collected with a plurality of detectors. In some embodiments, the XRF spectra are collected from a plurality of samples with a common matrix. In some embodiments, the XRF spectra are stored on a remote server or plurality of remote servers and accessed from a computing device. In some embodiments, the computing device is connected to and/or integrated with an XRF detector.

The method 100 further includes building a multivariate model at 104, which predicts concentration of the one or more elements or ions based on at least a portion of the XRF spectra for the samples. In some embodiments, building the multivariate model is performed according to or including any of the techniques described herein, such as described in relation to FIG. 4 through FIG. 8. The multivariate model may be built using one or more regression, classification, or data processing techniques including but not limited to: linear regression; multiple linear regression; stepwise linear regression; ridge regression; lasso regression; partial least squares; principal component regression; multivariate adaptive spline regression; tree-based methods; rule-based methods; boosting methods; bagging methods; ensemble learning methods; artificial neural networks; Cubist; random forest; and combinations thereof.

The plurality of XRF spectra (or at least some of the XRF spectra) have a known composition including, in some embodiments, at least one element of any of Li, Be, B, C, N, O, F, Na, Mg, Al, and Si. Building the multivariate model using XRF spectra with a known composition including at least one element of any of Li, Be, B, C, N, O, F, Na, Mg, Al, and Si can improve the detection and measurement of those elements when matrix effects are present in a sample. In some embodiments, the plurality of XRF spectra (or at least some of the XRF spectra) have a known composition including Cl. As described herein, conductivity, density, and TDS may be correlated to Na concentration, as it is one of the ions in produced waters. In some embodiments, the correlation between Na and Cl allows Cl concentration to be a proxy for TDS, as well.

In some embodiments, the method 100 includes creating a calibration file based at least partially on the multivariate model at 106. In some embodiments, the calibration file includes known energy peak locations. In some embodiments, the calibration file includes expected energy peak locations based at least partially on known components of a matrix. In some embodiments, the calibration file includes expected energy peak locations based at least partially on detected components of a matrix. In some embodiments, the calibration file includes known relative peak intensities based at least partially on known components of a matrix. In some embodiments, the calibration file includes known relative peak intensities based on detected components of a matrix identified in the plurality of spectra. For example, an expected peak intensity for a first energy peak location may be less than is otherwise measured, when a peak at a second energy peak location is identified. In such cases, the absorption of the matrix material associated with the second peak location may suppress the detection of the signal (e.g., characteristic x-rays) at the first energy.

The method 100 further includes applying the calibration file to an XRF detector or a computing device in data communication with the XRF detector at 108. In some embodiments, the calibration file is applied to the XRF detector, which collected the plurality of spectra. In some embodiments, the calibration file includes a background energy value for one or more energy values. For example, the calibration file may include a background energy value for a plurality of energy bins. In at least one embodiment, the calibration file includes a background energy value that is based at least partially on the measured secondary emission x-rays from a matrix material.

In some embodiments, the calibration file includes an offset value that corrects for differences between the x-ray detection sensor and/or detection material of the XRF detector and another XRF detector used to collect one or more spectra of the plurality of spectra. For example, the calibration file may include a nominal offset value that alters (increases or decreases) a measured energy value for a detected x-ray photon by a fixed amount. In another example, the calibration file may include a proportional offset value (i.e., multiplication factor) that alters (increases or decreases) a measured energy value for a detected x-ray photon proportionally to the measured energy value.

In some embodiments, the calibration file includes further information related to the creation of the calibration file and/or the multivariate model used to create the calibration file. For example, information or identification related to the device(s) used to collect the plurality of spectra for the multivariate model may allow a known offset value to be applied to the calibration file by the XRF detector to which the calibration file is applied. In other examples, a date of creation of the calibration file and/or a date of collection of one or more spectra of the plurality of spectra can allow a known offset value to be applied to the calibration file by the XRF detector to which the calibration file is applied to address drift in the detector over time.

In some embodiments, an offset value is calculated by measuring the composition of a known standard material. For example, a sample with a known composition may be measured, and the measured values using the calibration file may be compared to the known composition values to calculate an offset value. In some embodiments, the calibration file and/or the offset value includes environmental information. For example, the environmental information may include ambient or detector temperature, barometric pressure, humidity, etc. that allow the XRF detector or other XRF detectors to correlate and/or predict variations in measurements.

The method 100 can optionally further include collecting an XRF spectrum with the XRF detector at 110. For example, collecting the XRF spectrum with the XRF detector after applying the calibration file based at least partially on the multivariate model can allow further tuning of the calibration file or detector settings. In some embodiments, collecting the XRF spectrum with the XRF detector after applying the calibration file based at least partially on the multivariate model can allow the measurement or other determination of a composition of an unknown material.

In some embodiments, the method 100 may optionally include determining a concentration of the one or more elements or ions in the material at 111. In at least some embodiments, this concentration is determined at least based at least partially on the calibration. For example, the calibration file may, as described herein, compensate for one or more matrix effects resulting from the composition and/or distribution of the material being measured. In some embodiments, the calibration file can allow the detector to determine the concentration of one or more elements or ions in the material based on the broad spectrum by correlating the detection of a characteristic peak associated with a matrix of the material being measured and/or a characteristic peak associated with the one or more elements or ions of interest in the material. As will be described in more detail in relation to FIG. 13, in some embodiments, the concentration of the one or more elements or ions in the material (determined at least partially based on the calibration file) may be used to determine at least one at least one unknown physical or chemical property of the material.

In some embodiments, the XRF is a broad-spectrum detector. For example, the XRF detector may detect and measure characteristic x-rays across a range of at least 2 keV. In other examples, the XRF detector may detect and measure characteristic x-rays across a range of at least 8 keV. In yet other examples, the XRF detector may detect and measure characteristic x-rays across a range of at least 15 keV. In yet further examples, the XRF detector may detect and measure characteristic x-rays across a range of at least 30 keV. For example, the XRF detector may have a detection and/or measurement range of 1 keV to 3 keV, 2 keV to 10 keV, 0 keV to 15 keV, or 10 keV to 30 keV. In at least one embodiment, the XRF detector has a detection and/or measurement range of 0 keV to 40 keV.

Figure 10:
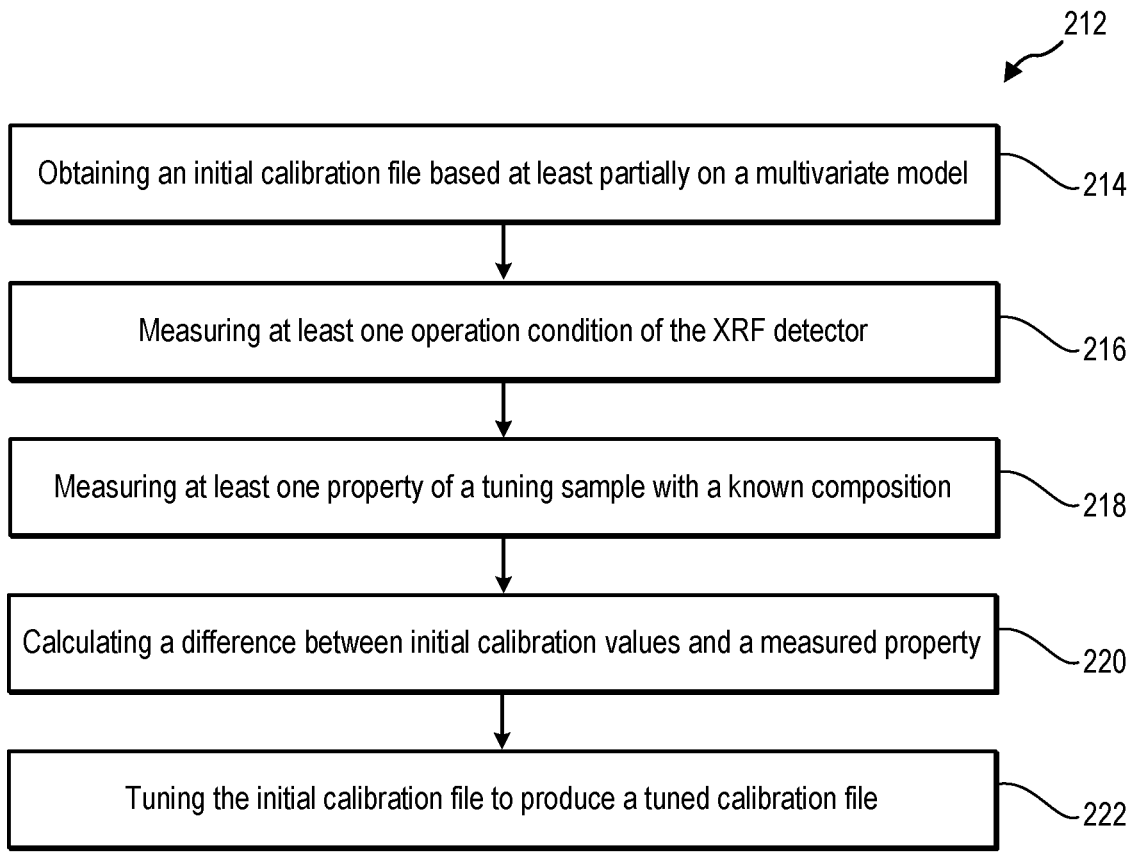
FIG. 10 is a flowchart illustrating a method of tuning a calibration file, according to at least some embodiments of the present disclosure.

FIG. 10 is a flowchart illustrating a method 212 of tuning a calibration file. Tuning the calibration file can modify, adjust, append, or otherwise customize a calibration file to a different XRF detector and/or a different sample than was used to create the calibration file. In at least one example, the XRF detector may be the same XRF detector, but during an intervening time period, the XRF detector may experience drift in the detection surface(s), changing the measured energy values of the incident x-rays. Tuning the calibration file, in some embodiments, may provide more accurate results to compensate for detector drift of a detector (e.g., age of the calibration file), changes in environmental conditions (such as ambient temperature, pressure, humidity, etc.), or tolerances between different detectors. In some embodiments, an initial calibration file may provide approximate values and/or measurements.

The method includes obtaining an initial calibration file at 214, where the initial calibration file is created according to any of the methods described herein. In some embodiments, obtaining the initial calibration file includes receiving the initial calibration file from a remote server, such as a cloud server. In some embodiments, obtaining the initial calibration file includes receiving the initial calibration file from a local hardware storage device, such as a local hard disk connected to and/or integrated in the computing device of the XRF detector. In some embodiments, obtaining the calibration file may include creating the calibration file locally at the computing device of the XRF detector, where the calibration file is out of date, created using a different sample (or set of samples), or created under different operating conditions.

Measuring at least one operating condition of the XRD detector at 216 and measuring at least one property of a tuning sample with a known composition at 218 provide a computing device of the XRF detector with information to tune the initial calibration file. In some embodiments, the operating conditions can include an excitation energy of an excitation source, an excitation spectrum, a sample chamber pressure (e.g., in a low-pressure chamber), environmental conditions, or other conditions specific to the measurement of the tuning sample with the known composition. In some embodiments, the known composition includes at least one element of the tuning sample and associated characteristic energy of a characteristic x-ray of the at least one element. In some embodiments, the known composition includes at least two elements of the tuning sample and associated characteristic energies of characteristic x-rays of the at least two elements. In some embodiments, the known composition includes all elements present in the tuning sample. In at least one embodiment, the known composition includes all elements and weight percentages of the elements present in the tuning sample.

The method 212 further includes calculating a difference between initial calibration values and a measured property at 220. In some embodiments, measuring the at least one property of the tuning sample at 218 includes measuring at least one peak position. In some embodiments, measuring the at least one property of the tuning sample at 218 includes measuring a spectrum including at least one peak position. Calculating a difference between initial calibration values and a measured property of the tuning sample may include comparing a measured peak position of the tuning sample and comparing the peak position to an expected peak position based on the known composition and the initial calibration values. For example, a measured peak position and an expected peak position for Aluminum may be calculated to be approximately 50 eV from one another.

In some embodiments, calculating a difference between initial calibration values and a measured property of the tuning sample may include comparing a measured peak height of the tuning sample and comparing the measured peak height to an expected peak height based on the known composition and the initial calibration values. For example, a measured peak height and an expected peak height for Aluminum may be calculated to be approximately 10% from one another.

In some embodiments, calculating a difference between initial calibration values and a measured property of the tuning sample may include comparing a measured peak width of the tuning sample and comparing the peak width to an expected peak width based on the known composition and the initial calibration values. For example, a measure peak width and an expected peak width for Aluminum may be calculated to be approximately 100 eV from one another.

The method 212 includes tuning the initial calibration file to produce a tuned calibration file at 222 based at least partially on the calculated difference between the measured property and an expected property of the tuned sample. For example, tuning the calibration file may include applying a nominal offset value to a spectrum or channel of characteristic x-ray energies to compensate for drift in the XRF detector.

Figure 11:
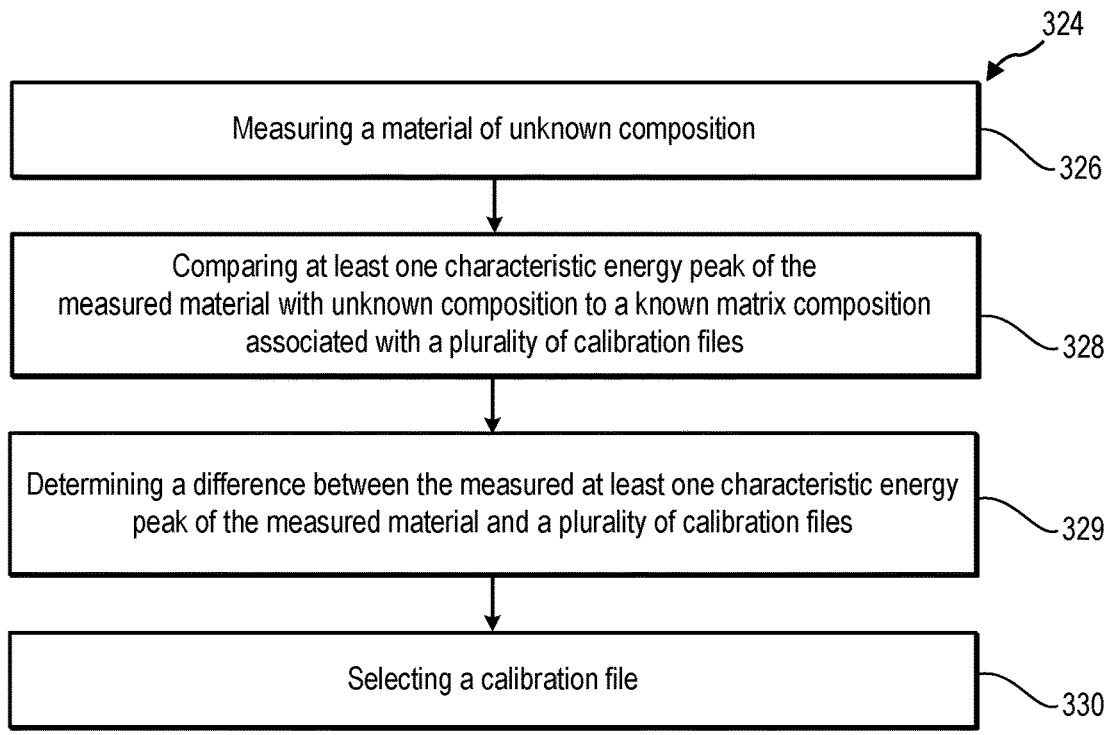
FIG. 11 is a flowchart illustrating a method of selecting a calibration file from a plurality of calibration files, according to at least some embodiments of the present disclosure.

FIG. 11 is a flowchart illustrating a method 324 of selecting a calibration file from a plurality of calibration files, where at least one of the calibration files of the plurality of calibration files is created using a multivariate model as described herein. In some embodiments, a system has stored thereon or access to a plurality of calibration files. The plurality of calibration files represents samples including different matrices. The method 324 includes measuring a material with an unknown composition at 326 and determining at one characteristic energy peak associated with an element of the matrix. In some embodiments, measuring the material includes selecting and/or energizing a region of the sample including a majority matrix. In some embodiments, measuring the material includes selecting and/or energizing a region of the sample including entirely matrix, such as a perimeter portion. In some embodiments, suspended solids, dissolved solids, or other materials of interest other than the matrix of the material are homogeneously distributed in the matrix and the matrix is unable to be isolated. In such embodiments, the composition of the matrix may be known, while other components of the material are unknown, allowing a characteristic energy peak of at least one element of the matrix to be measured. In some embodiments, the composition of the entire material is unknown, and a plurality of energy channels and/or a complete spectrum is measured.

The method 324 includes comparing the at least one characteristic energy peak of the measured material with an unknown composition to a known matrix composition associated with a calibration file at 328. For example, a calibration file according to the present disclosure can be created based on a plurality of samples containing a matrix that causes matrix effects. In some embodiments, the calibration file includes a spectrum and/or list of elements representative of the matrix composition.

The method 324 further includes determining a difference between the measured at least one characteristic energy peak of the measured material and determining or identifying the calibration file with smallest difference. For example, between a first calibration file and a second calibration file based on different samples, the calibration file with the smallest difference between the measured material and the matrix of the calibration file is selected at 330 and applied to the XRF detector. By selecting a calibration file based at least partially on a matrix of the sample from a plurality of calibration files associated with a variety of matrices, the selected calibration file may provide a more precise and/or accurate compensation for matrix effects.

Figure 12:
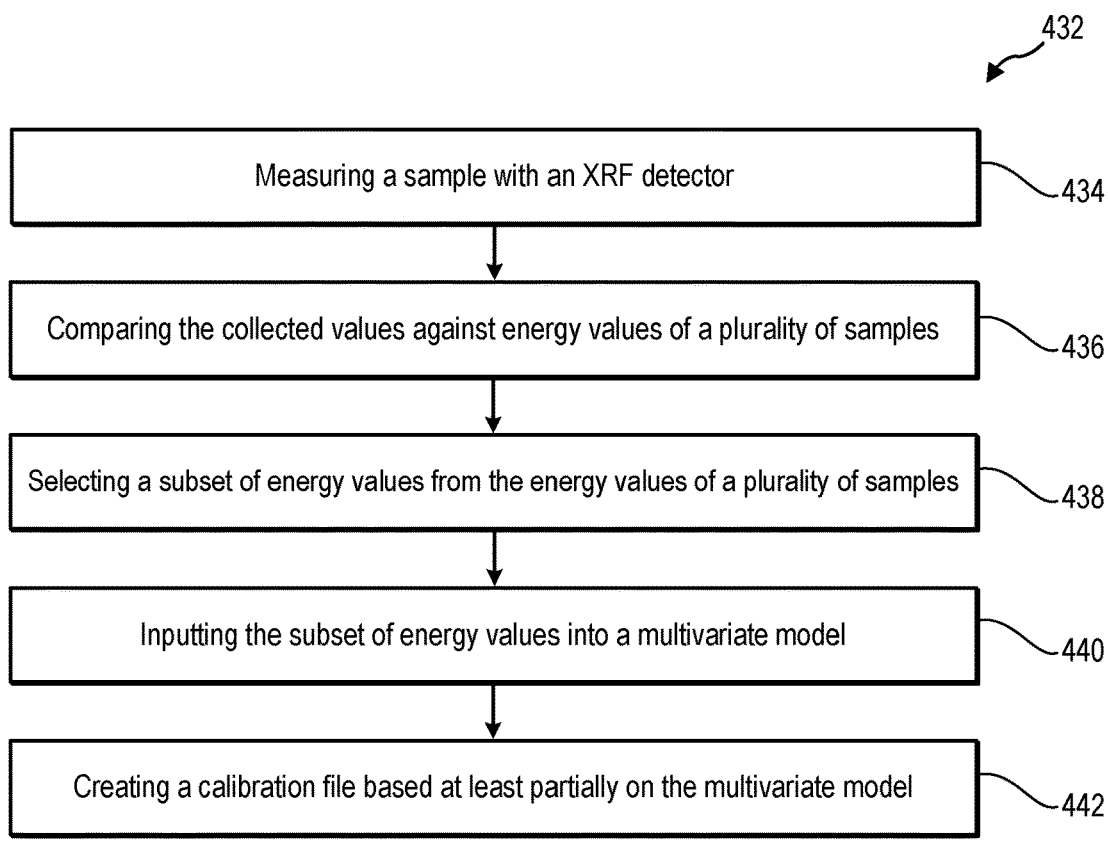
FIG. 12 is a flowchart illustrating a method of dynamically creating a calibration file using a multivariate model, according to at least some embodiments of the present disclosure.

In some embodiments, the XRF detector or computing device in communication with the XRF detector creates a calibration file based on a subset of available spectra that are selected based on the measured energy channels and/or spectrum of a material with an unknown composition. FIG. 12 is a flowchart illustrating a method 432 of dynamically creating a calibration file using a multivariate model according to the present disclosure. The method 432 includes measuring a material with an unknown composition with an XRF detector at 434. In some embodiments, measuring the sample includes collecting a spectrum of characteristic x-ray energies. In some embodiments, measuring the material includes collecting values for a plurality of energy channels. The method 432 further includes comparing the collected values against the energy values of a plurality of samples at 436. In some examples, a system has stored thereon or access to a plurality of energy values from other samples. In at least one example, the system accesses a remotely stored database of spectra or values for energy channels that share at least one energy channel with the collected values for the material measured by the XRF detector.

The method 432 further includes selecting a subset of energy values (e.g., XRF spectra) from the energy values of a plurality of samples at 438. The subset of energy values is selected based on a difference between each of the obtained spectra or energy channel values and the collected values for the material with an unknown composition measured by the XRF detector. For example, the subset is selected based at least partially on a nominal difference between the spectra. In at least one example, the nominal difference is measured by comparing the spectra collected with an equal and/or normalized x-ray count for each spectrum. In some examples, the subset is selected based at least partially on a percentage difference between the spectra. In at least one example, the percentage difference is measured by comparing the spectra collected with an equal and/or normalized x-ray count for each spectrum. When the obtained spectrum from the obtained plurality of samples is within a threshold value (percentage or nominal value) of the collected spectrum, the obtained spectrum is selected for the subset.

In some embodiments, specific energy channels of the collected and obtained energy values are compared to select the subset. For example, a user may select specific energy channels for comparison. In other examples, the system may select a pre-set quantity of energy channels, such as the center channel of the three highest energy peaks or of all identified energy peaks.

In some embodiments, the subset is selected based at least partially on the nominal difference in the energy channels. In at least one example, the nominal difference is measured by comparing the energy channel values collected with an equal and/or normalized x-ray count for each energy channel value. In some examples, the subset is selected based at least partially on a percentage difference between the energy channel values. In at least one example, the percentage difference is measured by comparing the energy channel values collected with an equal and/or normalized x-ray count for each energy channel value. When the obtained energy channel values from the obtained plurality of samples is within a threshold value (percentage or nominal value) of the collected energy channel value, the obtained energy channel values are selected for the subset.

The method 432 further includes inputting the subset of energy values into the multivariate model at 440. In some embodiments, the subset of spectra and/or energy channel values from the plurality of samples approximates the matrix of the collected material that is measured by the XRF detector at 434. By inputting the subset into a multivariate model according to the present disclosure, the method 432 further provides for creating a calibration file at 442 that is more closely related to the matrix effects of the current material.

Calculation and creation of a multivariate model and/or calibration file based on the multivariate model may be computationally intensive. In some examples, a system may store each calibration file on a local or remote storage device for future access. For example, the system may create a first calibration file based on a subset of spectra and/or energy values related to a first matrix and a second calibration file based on a subset of spectra and/or energy values related to a second matrix. In some embodiments, a method includes comparing a collected spectrum or energy values to the first calibration file and the second calibration and selecting one of the first calibration file and the second calibration based on the comparison.

Figure 13:
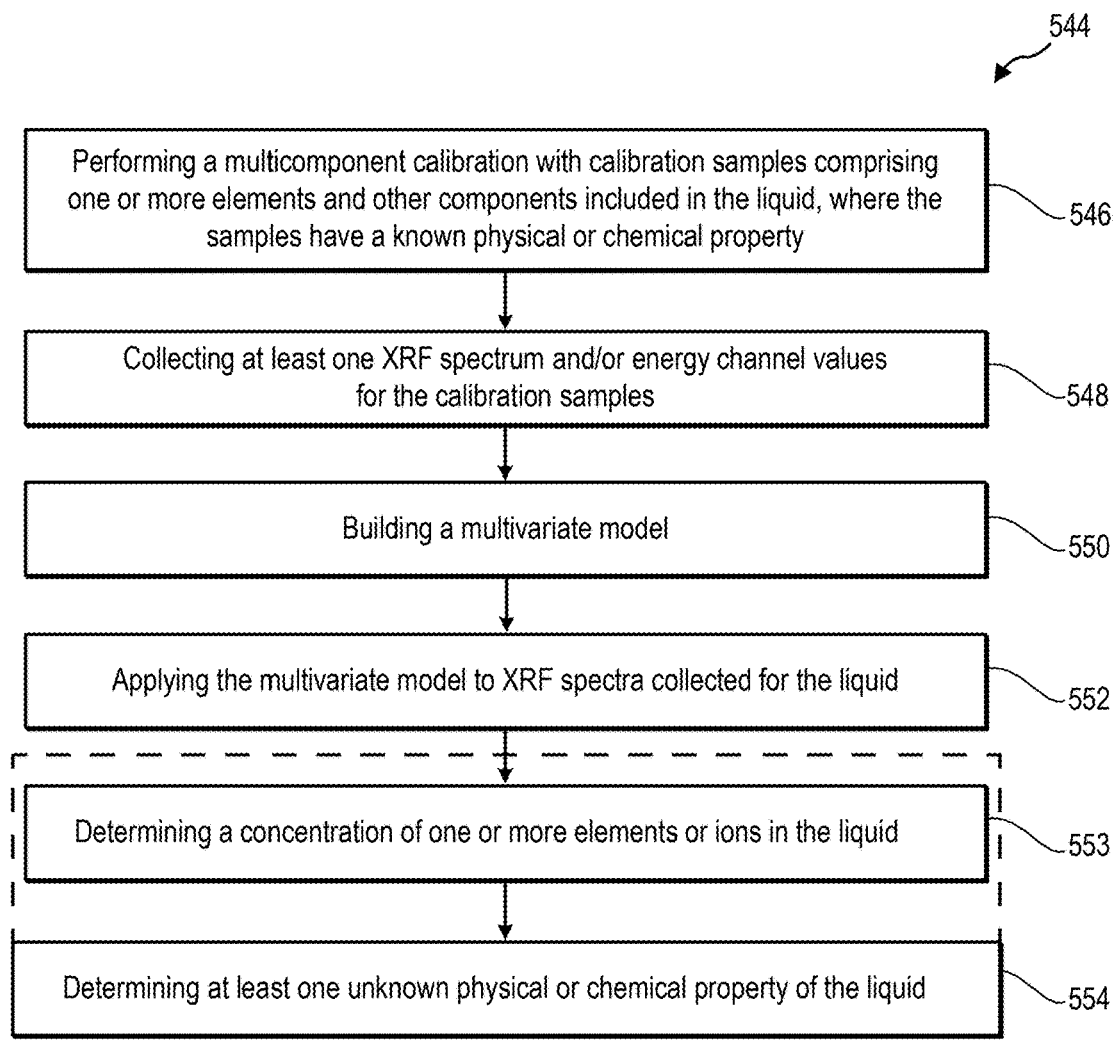
FIG. 13 is a flowchart illustrating a method of calibrating a system with a plurality of samples to determine material properties of a material in a liquid, according to at least some embodiments of the present disclosure.

In some embodiments, an XRF detector that is calibrated according to one or more of the methods described herein provides more accurate sample composition measures, which, in turn, provides more accurate determinations of properties of the sampled material(s). FIG. 13 is a flowchart illustrating a method 544 of calibrating a system with a plurality of samples to determine material properties of a material in a liquid. The method 544 includes performing a multicomponent calibration with calibration samples comprising one or more elements and other components included in the liquid, where the samples have a known physical or chemical property at 546. In some embodiments, performing the multicomponent calibration includes collecting at least one XRF spectrum and/or energy channel values for the calibration samples at 548 and building a multivariate model at 550 based at least partially on the collected XRF spectrum and/or energy channel values. In some embodiments, the multivariate model is built according to one or more methods described herein. In at least one embodiment, the multivariate model provides a correlation between the known physical or chemical property at least a portion of the at least one XRF spectrum and/or energy channel values for the samples.

The method 544 further includes applying the multivariate model to XRF spectra collected for the liquid at 552 and thereby determining at least one unknown physical or chemical property of the liquid at 554. In some embodiments, the unknown property is one or more of density, electrical conductivity, electrical resistivity, dielectric constant, thermal conductivity, heat capacity, viscosity, osmotic pressure, surface tension, interfacial tension, compressibility, total dissolved solids (TDS), salinity, hardness, pH, alkalinity, acidity, total organic carbon, total inorganic carbon, total suspended solids, turbidity, redox potential, chemical oxygen demand, and biological oxygen demand.

Unknown physical or chemical properties of the liquid and which are of interest are in some embodiments related to other concentration of the one or more elements or ions in the liquid. Accordingly, in some embodiments, determining at least one unknown physical or chemical property of the liquid at 554 is performed after determining a concentration of one or more elements or ions of the liquid at 553, which then allows use of the concentration determined at 553 in determining the unknown physical and/or chemical property at 554. For example, the physical or chemical properties of the liquid may be related to the composition of the liquid and/or phases of the liquid, such as emulsified, suspended, or dissolved phases, and the physical or chemical properties of the liquid may be correlated to the measured concentrations in the multivariate model and/or the calibration file. In the same or other embodiments, the XRF spectra are correlated with physical and chemical aqueous sample properties, for example, density, electrical conductivity, total dissolved solids, hardness, and properties, which can generally depend on sample composition, but are difficult to estimate just from a knowledge of the composition. In some embodiments, calculating these properties based on XRF spectra data alone allows reduction of the number of measurements that may be used to characterize samples.

While determining the concentration of the one or more elements in the material at 553 and determining the at least one unknown physical or chemical property of the liquid at 554 are shown as sequential, separate elements in the method 544 of FIG. 13, this is illustrative only. In some embodiments, the unknown physical or chemical property of the liquid may be determined at 554 without determining or using a concentration of one or more elements or ions in the liquid. In still other embodiments, the concentration of the one or more elements or ions in the liquid may be determined as a part of the act of determining the at least one unknown physical or chemical property of the liquid at 554 (as reflected by the dashed lines).

Figure 14:
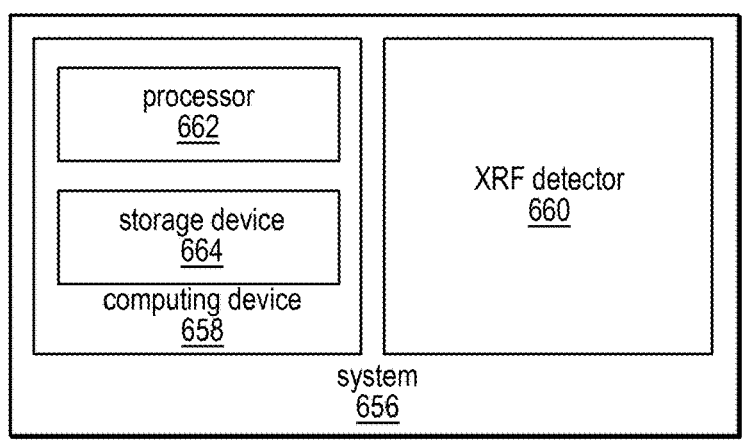
FIG. 14 is a system diagram of a computing device and XRF detector, according to at least some embodiments of the present disclosure.

The systems and method described herein, in some embodiments, allow an XRF detector and/or analyzer to calculate and compensate for matrix effects of a sample. By compensating for matrix effects, the XRF detector and/or analyzer can provide a user more accurate composition information of non-matrix components of the sample. FIG. 14 is a system diagram of a system 656 including a computing device 658 in data communication with an XRF detector 660. In some embodiments, the computing device 658 is integrated with the XRF detector 660. In some embodiments, the computing device 658 is in wired communication with the XRF detector 660. In some embodiments, the computing device 658 is in wireless communication with the XRF detector 660.

The computing device 658 includes a processor 662 in data communication with a hardware storage device 664. In some embodiments, the processor 662 is a general processor, such as a central processing unit (CPU). In some embodiments, the processor 662 is a specialized processor, such as an application specific integrated circuit (ASIC). The hardware storage device 664 has instructions stored thereon that, when executed by the processor, cause the computing device 658 to perform at least part of any method described herein. In some embodiments, the hardware storage device 664 includes any of volatile storage (e.g., random access memory), non-volatile storage (e.g., read-only memory), flash memory, or any combination of such memories.

INDUSTRIAL APPLICABILITY

A quick and reliable chemical analysis of produced waters remains one of the main challenges of scale risk mitigation, as it enables timely control over scale inhibitor type and dosage. While many analytical methods are potentially applicable to produced waters, most of them are not meeting reliability (under field conditions) and/or increasingly tight cost requirements. X-ray fluorescence (XRF) spectrometry can be used in the oilfield for analysis of cores, drilling cuttings and muds, as provides a quick non-invasive detection of many elements simultaneously. However, some XRF detectors or analyzers available on the market have limited element range, sensitivity, and resolution, which make their detection limits and accuracy suboptimal for produced water analysis. At the same time, one of the major challenges of XRF, the so-called matrix effect, when a characteristic x-ray fluorescence intensity of an element also depends on other elements present in the sample, is strong in produced waters and also affects the analysis accuracy. It should be understood that while examples referring to produced waters and samples mimicking produced waters are described, the presently described systems and methods are applicable to other fluid sample types including non-aqueous fluids, brines, suspensions, solutions, emulsions, other materials, and combinations thereof.

Embodiments described herein demonstrate how multivariate machine learning (ML) techniques can be applied to the full XRF spectra. ML spectra may mitigate matrix effects and enable simultaneous quantification of all scale-forming and other ions of interest. In some embodiments, key physical (e.g., density) and chemical (e.g., total dissolved solids and hardness) properties of produced water can be also quantified using ML techniques. In the embodiments described herein, experimental protocols are described, followed by a discussion of the data workflows, which covers the XRF spectra pre-processing, algorithm selection and tuning, and independent validation procedures. A rigorous error analysis can be performed with ML model errors and compared with those of the traditional univariate XRF processing. In field samples, the resulting analysis errors (RMSE) are less than 100 mg/l for barium and strontium, less than 150 mg/l for sulfate, and have proven accurate for other ions and properties.

In some embodiments, a calibration file is created and applied to the XRF detector or a computing device in data communication with the XRF detector based at least partially on a multivariate model according to the present disclosure. In some embodiments, a computing device in data communication with the XRF detector has a processor and a hardware storage device having instructions stored thereon that, when executed by the processor, cause the computing device to perform at least part of any method described herein. In some embodiments, a method of analyzing concentration of an element in a material, according to some embodiments of the present disclosure. The method includes obtaining XRF spectra for a plurality of samples, where each sample of the plurality of samples contains a known concentration of at least one element. In some embodiments, the XRF spectra are collected with the same XRF detector. In some embodiments, the XRF spectra are collected with a plurality of detectors. In some embodiments, the XRF spectra are collected from a plurality of samples with a common or similar matrix. In some embodiments, the XRF spectra are stored on a remote server or plurality of remote servers and accessed from computing device. In some embodiments, the computing device is connected to and/or integrated with an XRF detector.

The method further includes building a multivariate model, which predicts concentration of the one or more elements or ions based on at least a portion of the XRF spectra for the samples. In some embodiments, building the multivariate model is performed according to or including any of the techniques described herein, such as described herein. The multivariate model may be built using one or more regression, classification, or data processing techniques including but not limited to: linear regression; multiple linear regression; stepwise linear regression; ridge regression; lasso regression; partial least squares; principal component regression; multivariate adaptive spline regression; tree-based methods; rule-based methods; boosting methods; bagging methods; ensemble learning methods; artificial neural networks; Cubist; random forest; and combinations thereof.

The plurality of XRF spectra (or at least some of the XRF spectra) have a known composition including, in some embodiments, at least one element of any of Li, Be, B, C, N, O, F, Na, Mg, Al, and Si. Building the multivariate model using XRF spectra with a known composition including at least one element of any of Li, Be, B, C, N, O, F, Na, Mg, Al, and Si can improve the detection and measurement of those elements when matrix effects are present in a sample. In some embodiments, the plurality of XRF spectra (or at least some of the XRF spectra) have a known composition including Cl. As described herein, conductivity, density, and TDS may be correlated to Na concentration, as it is one of the ions in produced waters. In some embodiments, the correlation between Na and Cl allows Cl concentration to be a proxy for TDS, as well.

In some embodiments, the method includes creating a calibration file based at least partially on the multivariate model. In some embodiments, the calibration file includes known energy peak locations. In some embodiments, the calibration file includes expected energy peak locations based at least partially on known components of a matrix. In some embodiments, the calibration file includes expected energy peak locations based at least partially on detected components of a matrix. In some embodiments, the calibration file includes known relative peak intensities based at least partially on known components of a matrix. In some embodiments, the calibration file includes known relative peak intensities based on detected components of a matrix identified in the plurality of spectra. For example, an expected peak intensity for a first energy peak location may be less than is otherwise measured, when a peak at a second energy peak location is identified. In such cases, the absorption of the matrix material associated with the second peak location may suppress the detection of the signal (e.g., characteristic x-rays) at the first energy.

The method further includes applying the calibration file to an XRF detector. In some embodiments, the calibration file is applied to the XRF detector, which collected the plurality of spectra. In some embodiments, the calibration file includes a background energy value for one or more energy values. For example, the calibration file may include a background energy value for a plurality of energy bins. In at least one embodiment, the calibration file includes a background energy value that is based at least partially on the measured secondary emission x-rays from a matrix material.

In some embodiments, the calibration file includes an offset value that corrects for differences between the x-ray detection sensor and/or detection material of the XRF detector and another XRF detector used to collect one or more spectra of the plurality of spectra. For example, the calibration file may include a nominal offset value that alters (increases or decreases) a measured energy value for a detected x-ray photon by a fixed amount. In another example, the calibration file may include a proportional offset value (i.e., multiplication factor) that alters (increases or decreases) a measured energy value for a detected x-ray photon proportionally to the measured energy value.

In some embodiments, the calibration file includes further information related to the creation of the calibration file and/or the multivariate model used to create the calibration file. For example, information or identification related to the device(s) used to collect the plurality of spectra for the multivariate model may allow a known offset value to be applied to the calibration file by the XRF detector to which the calibration file is applied. In other examples, a date of creation of the calibration file and/or a date of collection of one or more spectra of the plurality of spectra can allow a known offset value to be applied to the calibration file by the XRF detector to which the calibration file is applied to address drift in the detector over time.

In some embodiments, an offset value is calculated by measuring the composition of a known standard material. For example, a sample with a known composition may be measured, and the measured values using the calibration file may be compared to the known composition values to calculate an offset value. In some embodiments, the calibration file and/or the offset value includes environmental information. For example, the environmental information may include ambient or detector temperature, barometric pressure, humidity, etc. that allow the XRF detector or other XRF detectors to correlate and/or predict variations in measurements.

The method can optionally further include collecting an XRF spectrum with the XRF detector. For example, collecting the XRF spectrum with the XRF detector after applying the calibration file based at least partially on the multivariate model can allow further tuning of the calibration file or detector settings. In some embodiments, collecting the XRF spectrum with the XRF detector after applying the calibration file based at least partially on the multivariate model can allow the measurement of a composition of an unknown material.

In some embodiments, the XRF is a broad-spectrum detector. For example, the XRF detector may detect and measure characteristic x-rays across a range of at least 2 keV. In other examples, the XRF detector may detect and measure characteristic x-rays across a range of at least 8 keV. In yet other examples, the XRF detector may detect and measure characteristic x-rays across a range of at least 15 keV. In yet further examples, the XRF detector may detect and measure characteristic x-rays across a range of at least 30 keV. For example, the XRF detector may have a detection and/or measurement range of 1 keV to 3 keV, 2 keV to 10 keV, 0 keV to 15 keV, or 10 keV to 30 keV. In at least one embodiment, the XRF detector has a detection and/or measurement range of 0 keV to 40 keV.

Tuning the calibration file can modify, adjust, append, or otherwise customize a calibration file to a different XRF detector and/or a different sample than was used to create the calibration file. In at least one example, the XRF detector may be the same XRF detector, but during an intervening time period, the XRF detector may experience drift in the detection surface(s), changing the measured energy values of the incident x-rays. Tuning the calibration file, in some embodiments, may provide more accurate results to compensate for detector drift of a detector (e.g., age of the calibration file), changes in environmental conditions (such as ambient temperature, pressure, humidity, etc.), or tolerances between different detectors. In some embodiments, an initial calibration file may provide approximate values and/or measurements.

In some embodiments, the method includes obtaining an initial calibration file, where the initial calibration file is created according to any of the methods described herein. In some embodiments, obtaining the initial calibration file includes receiving the initial calibration file from a remote server, such as a cloud server. In some embodiments, obtaining the initial calibration file includes receiving the initial calibration file from a local hardware storage device, such as a local hard disk connected to and/or integrated in the computing device of the XRF detector. In some embodiments, obtaining the calibration file may include creating the calibration file locally at the computing device of the XRF detector, where the calibration file is out of date, created using a different sample (or set of samples), or created under different operating conditions.

Measuring at least one operating condition of the XRD detector and measuring at least one property of a tuning sample with a known composition provide a computing device of the XRF detector with information to tune the initial calibration file. In some embodiments, the operating conditions can include an excitation energy of an excitation source, an excitation spectrum, a sample chamber pressure (e.g., in a low-pressure chamber), environmental conditions, or other conditions specific to the measurement of the tuning sample with the known composition. In some embodiments, the known composition includes at least one element of the tuning sample and associated characteristic energy of a characteristic x-ray of the at least one element. In some embodiments, the known composition includes at least two elements of the tuning sample and associated characteristic energies of characteristic x-rays of the at least two elements. In some embodiments, the known composition includes all elements present in the tuning sample. In at least one embodiment, the known composition includes all elements and weight percentages of the elements present in the tuning sample.

The method further includes calculating a difference between initial calibration values and a measured property. In some embodiments, measuring the at least one property of the tuning sample includes measuring at least one peak position. In some embodiments, measuring the at least one property of the tuning sample includes measuring a spectrum including at least one peak position. Calculating a difference between initial calibration values and a measured property of the tuning sample may include comparing a measured peak position of the tuning sample and comparing the peak position to an expected peak position based on the known composition and the initial calibration values. For example, a measured peak position and an expected peak position for Aluminum may be calculated to be approximately 50 eV from one another.

In some embodiments, calculating a difference between initial calibration values and a measured property of the tuning sample may include comparing a measured peak height of the tuning sample and comparing the measured peak height to an expected peak height based on the known composition and the initial calibration values. For example, a measured peak height and an expected peak height for Aluminum may be calculated to be approximately 10% from one another.

In some embodiments, calculating a difference between initial calibration values and a measured property of the tuning sample may include comparing a measured peak width of the tuning sample and comparing the peak width to an expected peak width based on the known composition and the initial calibration values. For example, a measure peak width and an expected peak width for Aluminum may be calculated to be approximately 100 eV from one another.

The method includes tuning the initial calibration file to produce a tuned calibration file based at least partially on the calculated difference between the measured property and an expected property of the tuned sample. For example, tuning the calibration file may include applying a nominal offset value to a spectrum or channel of characteristic x-ray energies to compensate for drift in the XRF detector.

In some embodiments, a method includes selecting a calibration file from a plurality of calibration files, where at least one of the calibration files of the plurality of calibration files is created using a multivariate model as described herein. In some embodiments, a system has stored thereon or access to a plurality of calibration files. The plurality of calibration files represents samples including different matrices. The method includes measuring a material with an unknown composition and determining at one characteristic energy peak associated with an element of the matrix. In some embodiments, measuring the material includes selecting and/or energizing a region of the sample including a majority matrix. In some embodiments, measuring the material includes selecting and/or energizing a region of the sample including entirely matrix, such as a perimeter portion. In some embodiments, suspended solids, dissolved solids, or other materials of interest other than the matrix of the material are homogeneously distributed in the matrix and the matrix is unable to be isolated. In such embodiments, the composition of the matrix may be known, while other components of the material are unknown, allowing a characteristic energy peak of at least one element of the matrix to be measured. In some embodiments, the composition of the entire material is unknown, and a plurality of energy channels and/or a complete spectrum is measured.

The method includes comparing the at least one characteristic energy peak of the measured material with an unknown composition to a known matrix composition associated with a calibration file. For example, a calibration file according to the present disclosure is created based on a plurality of samples containing a matrix that causes matrix effects. In some embodiments, the calibration file includes a spectrum and/or list of elements representative of the matrix composition.

The method further includes determining a difference between the measured at least one characteristic energy peak of the measured material and determining the calibration file with smallest difference. For example, between a first calibration file and a second calibration file based on different samples, the calibration file with the smallest difference between the measured material and the matrix of the calibration file is selected and applied to the XRF detector. By selecting a calibration file based at least partially on a matrix of the sample from a plurality of calibration files associated with a variety of matrices, the selected calibration file may provide a more precise and/or accurate compensation for matrix effects.

In some embodiments, the XRF detector or computing device in communication with the XRF detector creates a calibration file based on a subset of available spectra that are selected based on the measured energy channels and/or spectrum of a material with an unknown composition. In some embodiments, a method of dynamically creating a calibration file using a multivariate model includes measuring a material with an unknown composition with an XRF detector. In some embodiments, measuring the sample includes collecting a spectrum of characteristic x-ray energies. In some embodiments, measuring the material includes collecting values for a plurality of energy channels. The method further includes comparing the collected values against the energy values of a plurality of samples. In some examples, a system has stored thereon or access to a plurality of energy values from other samples. In at least one example, the system accesses a remotely stored database of spectra or values for energy channels that share at least one energy channel with the collected values for the material measured by the XRF detector.

The method further includes selecting a subset of energy values (e.g., XRF spectra) from the energy values of a plurality of samples. The subset of energy values is selected based on a difference between each of the obtained spectra or energy channel values and the collected values for the material with an unknown composition measured by the XRF detector. For example, the subset is selected based at least partially on a nominal difference between the spectra. In at least one example, the nominal difference is measured by comparing the spectra collected with an equal and/or normalized x-ray count for each spectrum. In some examples, the subset is selected based at least partially on a percentage difference between the spectra. In at least one example, the percentage difference is measured by comparing the spectra collected with an equal and/or normalized x-ray count for each spectrum. When the obtained spectrum from the obtained plurality of samples is within a threshold value (percentage or nominal value) of the collected spectrum, the obtained spectrum is selected for the subset.

In some embodiments, specific energy channels of the collected and obtained energy values are compared to select the subset. For example, a user may select specific energy channels for comparison. In other examples, the system may select a pre-set quantity of energy channels, such as the center channel of the three highest energy peaks or of all identified energy peaks.

In some embodiments, the subset is selected based at least partially on the nominal difference in the energy channels. In at least one example, the nominal difference is measured by comparing the energy channel values collected with an equal and/or normalized x-ray count for each energy channel value. In some examples, the subset is selected based at least partially on a percentage difference between the energy channel values. In at least one example, the percentage difference is measured by comparing the energy channel values collected with an equal and/or normalized x-ray count for each energy channel value. When the obtained energy channel values from the obtained plurality of samples is within a threshold value (percentage or nominal value) of the collected energy channel value, the obtained energy channel values are selected for the subset.

The method further includes inputting the subset of energy values into the multivariate model. In some embodiments, the subset of spectra and/or energy channel values from the plurality of samples approximates the matrix of the collected material that is measured by the XRF detector. By inputting the subset into a multivariate model according to the present disclosure, the method further provides for creating a calibration file that is more closely related to the matrix effects of the current material.

Calculation and creation of a multivariate model and/or calibration file based on the multivariate model may be computationally intensive. In some examples, a system may store each calibration file on a local or remote storage device for future access. For example, the system may create a first calibration file based on a subset of spectra and/or energy values related to a first matrix and a second calibration file based on a subset of spectra and/or energy values related to a second matrix. In some embodiments, a method includes comparing a collected spectrum or energy values to the first calibration file and the second calibration and selecting one of the first calibration file and the second calibration based on the comparison.

In some embodiments, an XRF detector that is calibrated according to one or more of the methods described herein provides more accurate sample composition measures, which, in turn, provides more accurate determinations of properties of the sampled material(s). In some embodiments, a method allows for calibrating a system with a plurality of samples to determine material properties of a material in a liquid. The method includes performing a multicomponent calibration with calibration samples comprising one or more elements and other components included in the liquid, where the samples have a known physical or chemical property. In some embodiments, performing the multicomponent calibration includes collecting at least one XRF spectrum and/or energy channel values for the calibration samples and building a multivariate model based at least partially on the collected XRF spectrum and/or energy channel values. In some embodiments, the multivariate model is built according to one or more methods described herein. In at least one embodiment, the multivariate model provides a correlation between the known physical or chemical property at least a portion of the at least one XRF spectrum and/or energy channel values for the samples.

The method further includes applying the multivariate model to XRF spectra collected for the liquid and thereby calculating at least one unknown physical or chemical property of the liquid. In some embodiments, the unknown property is one or more of density, electrical conductivity, electrical resistivity, dielectric constant, thermal conductivity, heat capacity, viscosity, osmotic pressure, surface tension, interfacial tension, compressibility, total dissolved solids (TDS), salinity, hardness, pH, alkalinity, acidity, total organic carbon, total inorganic carbon, total suspended solids, turbidity, redox potential, chemical oxygen demand, and biological oxygen demand.

In some embodiments, determining at least one unknown physical or chemical property of the liquid includes or follows determining a concentration of one or more elements or ions of the liquid. For example, the physical or chemical properties of the liquid may be related to the composition of the liquid and/or phases of the liquid, such as emulsified, suspended, or dissolved phases, and the physical or chemical properties of the liquid may be correlated to the measured concentrations in the multivariate model and/or the calibration file. The concentration of one or more elements or ions in the liquid relates to the physical and/or chemical properties of the liquid, and thus the concentration of the one or more elements or ions may be correlated with the other properties of the liquid. In the same or other embodiments, the XRF spectra are correlated with physical and chemical aqueous sample properties, for example, density, electrical conductivity, total dissolved solids, hardness, and properties, which can generally depend on sample composition, but are difficult to estimate just from a knowledge of the composition. In some embodiments, calculating these properties based on XRF spectra data alone allows reduction of the number of measurements that may be used to characterize samples.

While embodiments disclosed herein may be used in the oil, gas, hydrocarbon exploration or production environments, or in the production of other natural resources, such environments are merely illustrative. Systems, tools, assemblies, methods, devices, and other components of the present disclosure, or which would be appreciated in view of the disclosure herein, may be used in other applications and environments. In other embodiments, embodiments of the present disclosure may be used outside of a downhole environment, including in connection with the placement of utility lines, or in the automotive, aquatic, aerospace, hydroelectric, manufacturing, or telecommunications industries.

In the description herein, various relational terms may be used to facilitate an understanding of various aspects of some embodiments of the present disclosure. Relational terms such as "bottom," "below," "top," "above," "back," "front," "left," "right," "rear," "forward," "up," "down," "horizontal," "vertical," "clockwise," "counter clockwise," "upper," "lower," and the like, may be used to describe various components, including their operational or illustrated position relative to one or more other components. Relational terms do not indicate a particular orientation for each embodiment within the scope of the description or claims, but are intended for convenience in facilitating reference to various components. Thus, such relational aspects may be reversed, flipped, rotated, moved in space, placed in a diagonal orientation or position, placed horizontally or vertically, or similarly modified.

Certain descriptions or designations of components as "first," "second," "third," and the like are also used to differentiate between identical components or between components which are similar in use, structure, or operation. Such language is not intended to limit a component to a singular designation or require multiple components. As such, a component referenced in the specification as the "first" component may be the same or different than a component that is referenced in the claims as a "first" component, and a claim may include a "first" component without requiring the existence of a "second" component.

Furthermore, while the description or claims may refer to "an additional" or "other" element, feature, aspect, component, or the like, it does not preclude there being a single element, or more than one, of the additional element. Where the claims or description refer to "a" or "an" element, such reference is not be construed that there is just one of that element, but is instead to be inclusive of other components and understood as "at least one" of the element. It is to be understood that where the specification states that a component, feature, structure, function, or characteristic "may," "might," "can," or "could" be included, that particular component, feature, structure, or characteristic is provided in certain embodiments, but is optional for other embodiments of the present disclosure. The terms "couple," "coupled," "connect," "connection," "connected," "in connection with," and "connecting" refer to "in direct connection with," or "in connection with via one or more intermediate elements or members." Components that are "integral" or "integrally" formed include components made from the same piece of material, or sets of materials, such as by being commonly molded or cast from the same material, in the same molding or casting process, or commonly machined from the same piece of material stock. Components that are "integral" should also be understood to be "coupled" together.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

Although various example embodiments have been described in detail herein, those skilled in the art will readily appreciate in view of the present disclosure that many modifications are possible in the example embodiments without materially departing from the present disclosure. Accordingly, any such modifications are intended to be included in the scope of this disclosure. Likewise, while the disclosure herein contains many specifics, these specifics should not be construed as limiting the scope of the disclosure or of any of the appended claims, but merely as providing information pertinent to one or more specific embodiments that may fall within the scope of the disclosure and the appended claims. Any described features from the various embodiments disclosed may be employed in combination.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The Abstract at the end of this disclosure is provided to allow the reader to quickly ascertain the general nature of some embodiments of the present disclosure. It is submitted with the understanding that it will not be used to interpret or limit the scope or meaning of the claims.

What is claimed is:

1. A method of analyzing concentration of one or more elements, comprising:
    obtaining x-ray fluorescence (XRF) spectra for a plurality of samples containing a known concentration of at least one element;
    building a multivariate model which predicts concentration of one or more elements or ions based on at least a portion of the XRF spectra for the plurality of samples and the known concentration of the at least one element of the plurality of samples;
    creating a calibration file based at least partially on the multivariate model;
    obtaining an XRF spectrum of a material with unknown composition using an XRF detector that has been calibrated based on the calibration file, wherein the XRF spectrum does not show a characteristic peak of the one or more elements or ions in the material; and
    determining, by the XRF detector, a concentration of the one or more elements or ions in the material based at least partially on the calibration.

2. The method of claim 1, wherein the XRF spectra for the plurality of samples are collected using the XRF detector.

3. The method of claim 1, further comprising tuning the XRF detector using the calibration file.

4. The method of claim 1, further comprising tuning a drift of the XRF detector based at least partially on an age of the calibration file.

5. The method of claim 1, wherein obtaining the XRF spectra for the plurality of samples includes accessing the XRF spectra from a remote server.

6. The method of claim 1, wherein at least some of the XRF spectra for the plurality of samples include operating conditions associated with conditions during collection of the XRF spectra.

7. The method of claim 1, wherein the at least one element includes Cl.

8. The method of claim 1, wherein the at least one element is one or more selected from a group consisting of Li, Be, B, C, N, O, F, Na, Mg, Al, and Si.

9. The method of claim 1, wherein the XRF detector is a broad-spectrum detector.

10. The method of claim 1, further comprising determining at least one unknown physical or chemical property of the material based at least partially on the concentration of the one or more elements or ions in the material.

11. The method of claim 1, wherein the calibration file is a first calibration file and the multivariate model is a first multivariate model, the method further comprising creating a second calibration file with a second multivariate model based on a subset of the XRF spectra for the plurality of samples.

12. The method of claim 11, further comprising selecting one of the first calibration file or the second calibration file based at least partially on a collected spectrum of a material with unknown composition.

13. The method of claim 12, wherein the second calibration file is selected based at least partially on a difference between the collected spectrum and the subset of the XRF spectra for the plurality of samples.

14. The method of claim 1, wherein building the multivariate model comprises one or more regression, classification, or data processing techniques including: linear regression; multiple linear regression; stepwise linear regression; ridge regression; lasso regression; partial least squares; principal component regression; multivariate adaptive spline regression; tree-based methods; rule-based methods; boosting methods; bagging methods; ensemble learning methods; artificial neural networks; Cubist; or Random Forest.

15. A method of measuring a physical or chemical property of a liquid, the method comprising:
    performing a multicomponent calibration of an x-ray fluorescence (XRF) detector with samples comprising one or more elements and having a known physical or chemical property, wherein the multicomponent calibration includes:

collecting XRF spectra for the samples; and
building a multivariate model including the known known physical or chemical property;
applying, by the XRF detector, the multivariate model to an XRF spectrum collected from a liquid, wherein the XRF spectrum does not show a characteristic peak of one or more elements or ions in the liquid; and
determining, by the XRF detector, at least one unknown physical or chemical property of the liquid based at least partially on the collected XRF spectrum and the multivariate model.

16. The method of claim 15, wherein the at least one unknown physical or chemical property includes one or more properties selected from the group consisting of density, electrical conductivity, electrical resistivity, dielectric constant, thermal conductivity, heat capacity, viscosity, osmotic pressure, surface tension, interfacial tension, compressibility, total dissolved solids (TDS), salinity, hardness, pH, alkalinity, acidity, total organic carbon, total inorganic carbon, total suspended solids, turbidity, redox potential, chemical oxygen demand, biological oxygen demand, and combinations thereof.

17. A system for analyzing concentration of an element, comprising:
an x-ray fluorescence (XRF) detector; and
a computing device in data communication with the XRF detector, the computing device including:
a processor, and
a hardware storage device having instructions stored thereon that, when executed by the processor, cause the computing device to:
obtain XRF spectra for a plurality of samples, where each sample of the plurality of samples contains a known concentration of at least one element;
build a multivariate model which predicts concentration of one or more elements or ions based on at least a portion of the XRF spectra for the plurality of samples;
create a calibration file based at least partially on the multivariate model; and
calibrate the XRF detector based on the calibration file;
wherein the XRF detector is configured to:
obtain an XRF spectrum of a material with unknown composition, the XRF spectrum not showing a characteristic peak of the one or more elements or ions in the material; and
determine a concentration of the one or more elements or ions in the material based at least partially on the calibration.

18. The system of claim 17, wherein the calibration file is a first calibration file and the multivariate model is a first multivariate model, wherein the instructions, when executed by the processor, further cause the computing device to create a second calibration file with a second multivariate model based on a subset of the XRF spectra for the plurality of samples.

19. The system of claim 18, wherein the instructions, when executed by the processor, further cause the computing device to select one of the first calibration file or the second calibration file based at least partially on a collected spectrum of a material of unknown composition.

* * * * *